US006904929B2

(12) United States Patent
Ruschke

(10) Patent No.: US 6,904,929 B2
(45) Date of Patent: Jun. 14, 2005

(54) CHECK VALVE AND FILTER ASSEMBLY INCORPORATING SUCH VALVE, ESPECIALLY FOR WATER COOLER ASSEMBLIES

(75) Inventor: Rick R. Ruschke, Woodstock, IL (US)

(73) Assignee: Filtertek Inc., Hebron, IL (US)

( * ) Notice: Subject to any disclaimer, the term of this patent is extended or adjusted under 35 U.S.C. 154(b) by 0 days.

(21) Appl. No.: 10/890,783

(22) Filed: Jul. 14, 2004

(65) Prior Publication Data

US 2004/0231720 A1 Nov. 25, 2004

Related U.S. Application Data

(63) Continuation-in-part of application No. 10/175,462, filed on Jun. 19, 2002, now abandoned.
(60) Provisional application No. 60/301,375, filed on Jun. 26, 2001.

(51) Int. Cl.[7] .............................................. F16K 24/04
(52) U.S. Cl. .................... 137/202; 137/550; 222/189.09
(58) Field of Search ................................ 137/202, 550; 222/189.09

(56) References Cited

U.S. PATENT DOCUMENTS

| 4,742,843 A | * | 5/1988 | McClaran ................. 137/202 |
| 4,966,199 A | | 10/1990 | Ruschke |
| 5,297,700 A | | 3/1994 | Burrows et al. |
| 5,667,103 A | | 9/1997 | Donselman et al. |
| 5,676,278 A | | 10/1997 | Beyer et al. |
| 5,682,917 A | | 11/1997 | Curving |
| 5,911,341 A | | 6/1999 | Donselman et al. |
| 5,927,557 A | | 7/1999 | Busick et al. |
| 6,003,318 A | | 12/1999 | Busick et al. |
| 6,029,860 A | | 2/2000 | Donselman et al. |
| 6,062,255 A | | 5/2000 | Busick |
| 6,089,258 A | | 7/2000 | Busick et al. |
| 6,119,462 A | | 9/2000 | Busick et al. |
| 6,123,232 A | | 9/2000 | Donselman et al. |
| 6,167,921 B1 | | 1/2001 | Busick et al. |

FOREIGN PATENT DOCUMENTS

| FR | 2242896 | 3/1988 |
| JP | 59 034932 A | 2/1984 |
| JP | 59 034932 A | 6/1984 |

OTHER PUBLICATIONS

Ball type check valve filter assembly.
Diaphragm type check valve filter assembly.
Diaphragm type check valve.

* cited by examiner

Primary Examiner—Gerald A. Michalsky
(74) Attorney, Agent, or Firm—Brinks Hofer Gilson & Lione

(57) ABSTRACT

A normally open check valve, incorporating a bell-shaped check valve member, and filter assembly incorporating same, wherein the specific gravity of the bell shaped member volume as defined by the throat, and exterior wall of the bell shaped member is less than one, and the bell shaped member is disposed adjacent a valve seat in a chamber with the throat opening thereof generally facing a liquid source, among other things. The low specific gravity for the bell shaped member volume may be attained by way of example, by the bell shaped member interior capturing and retaining a gas bubble when the throat of the member is exposed to a liquid-gas interface, or by a thin member covering the throat of the bell shaped member to encapsulate a gas bubble, or by a foamed synthetic resin material in the interior of the bell shaped member, or a combination thereof.

112 Claims, 13 Drawing Sheets

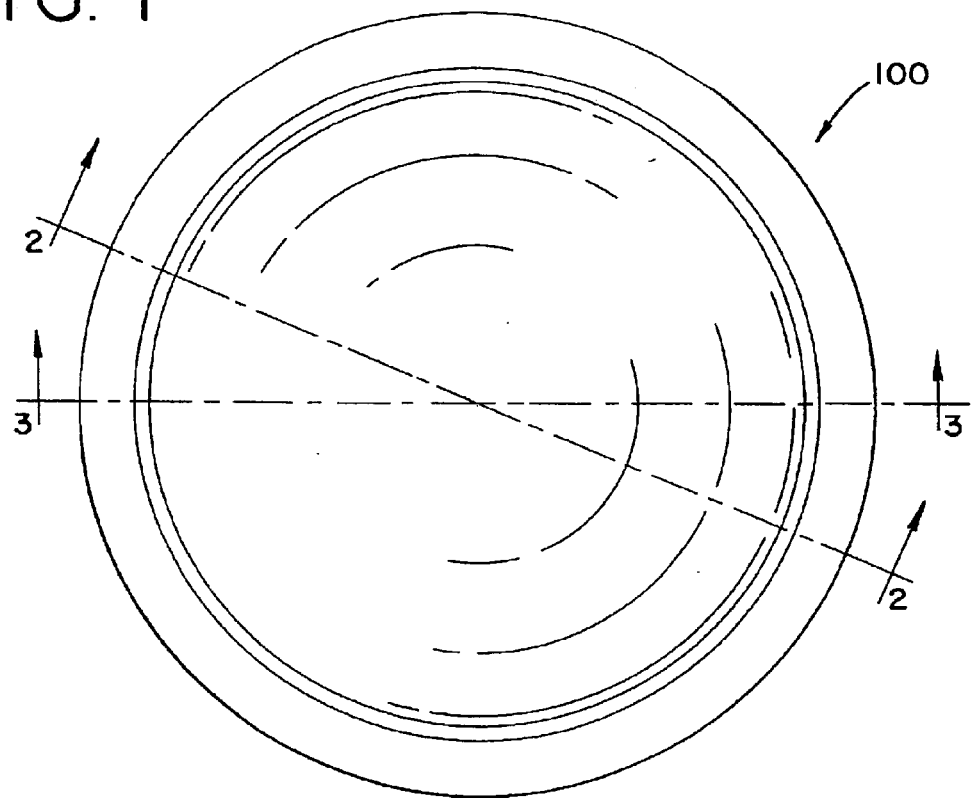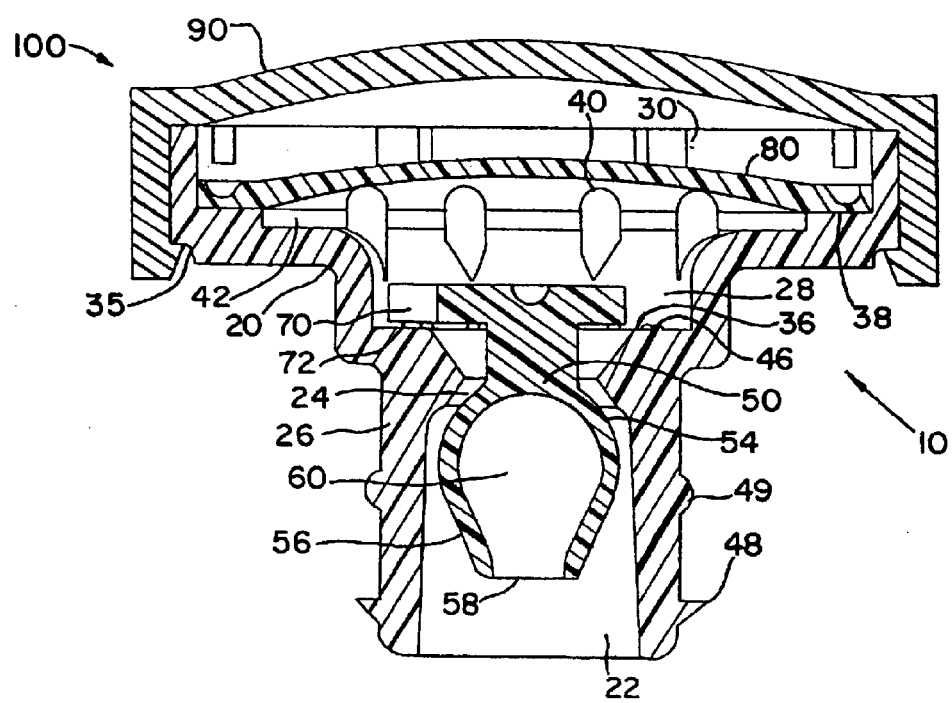

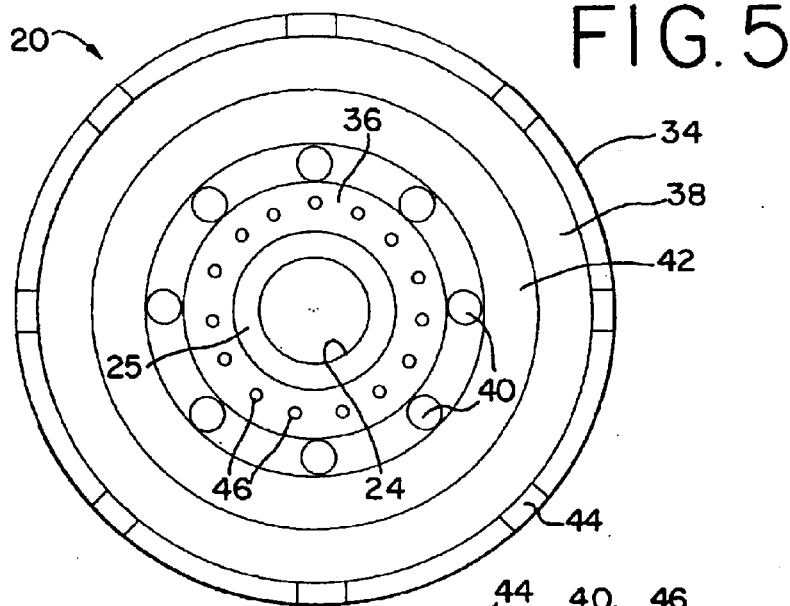
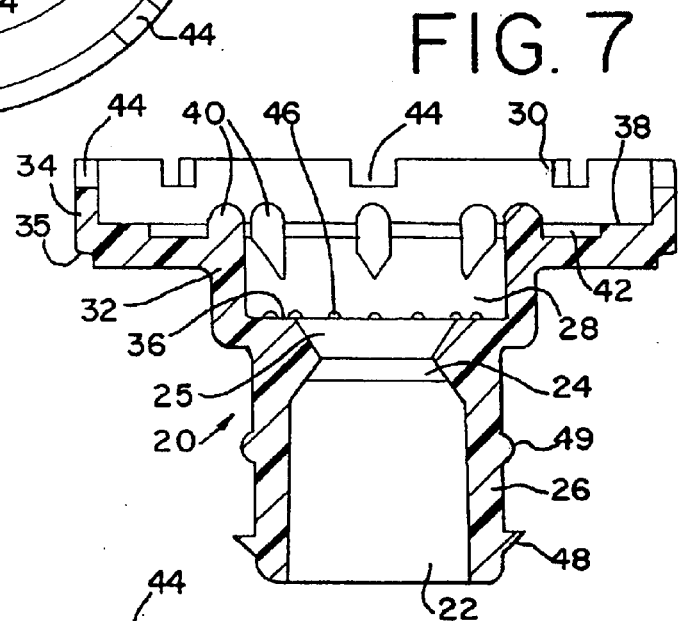
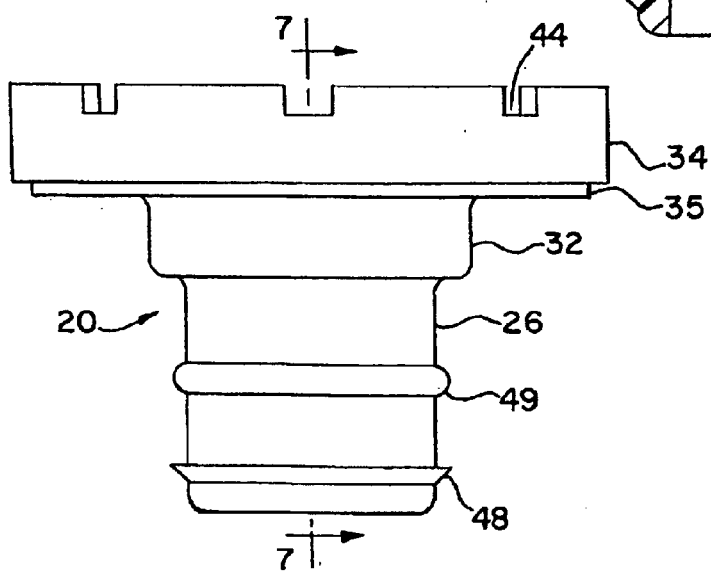

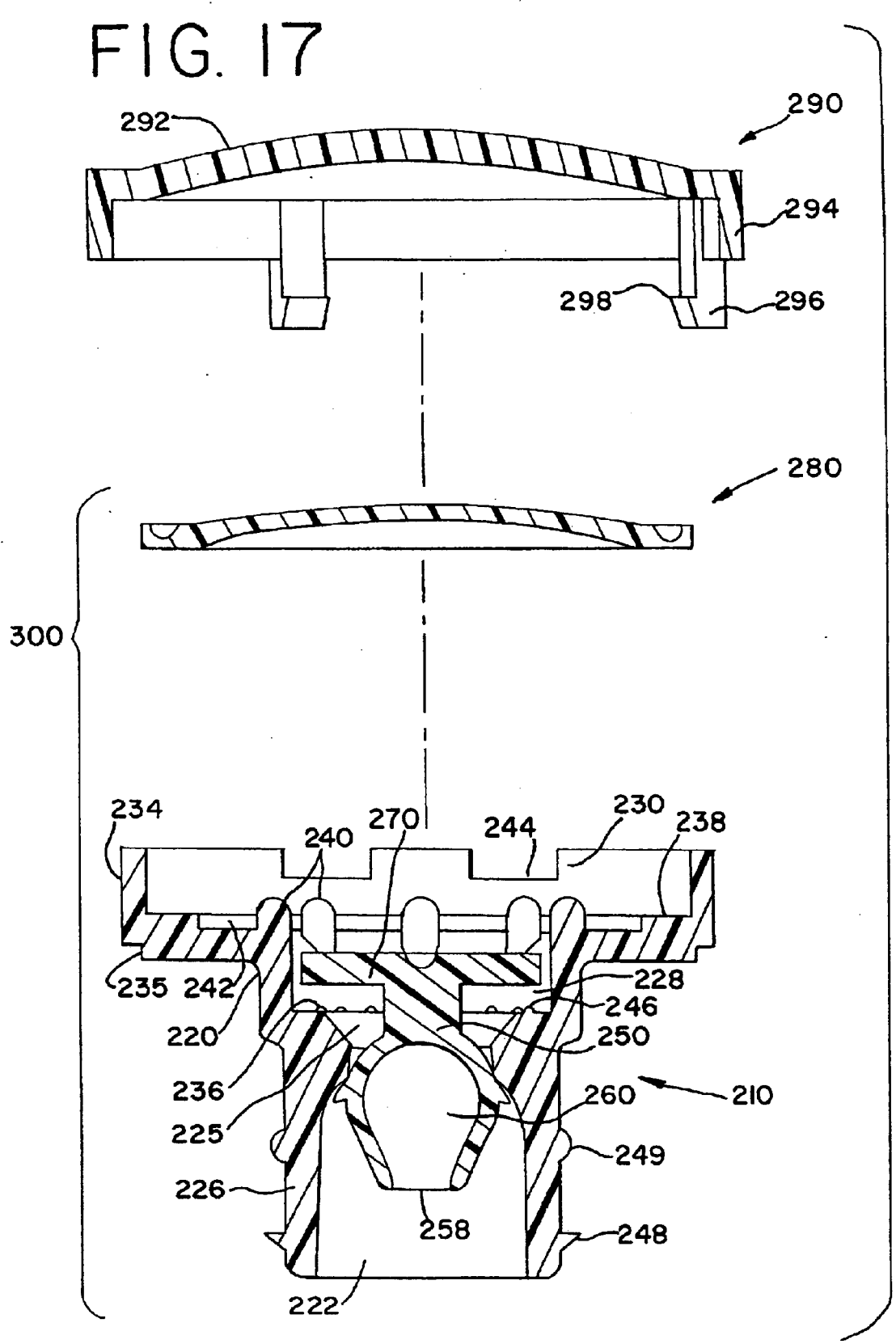

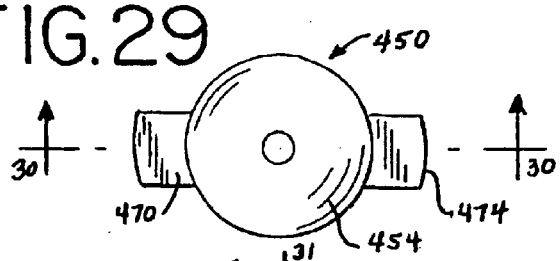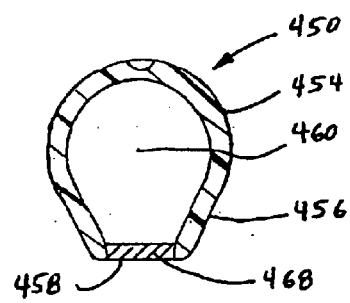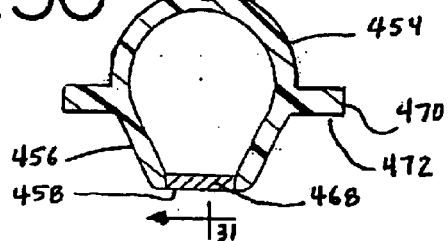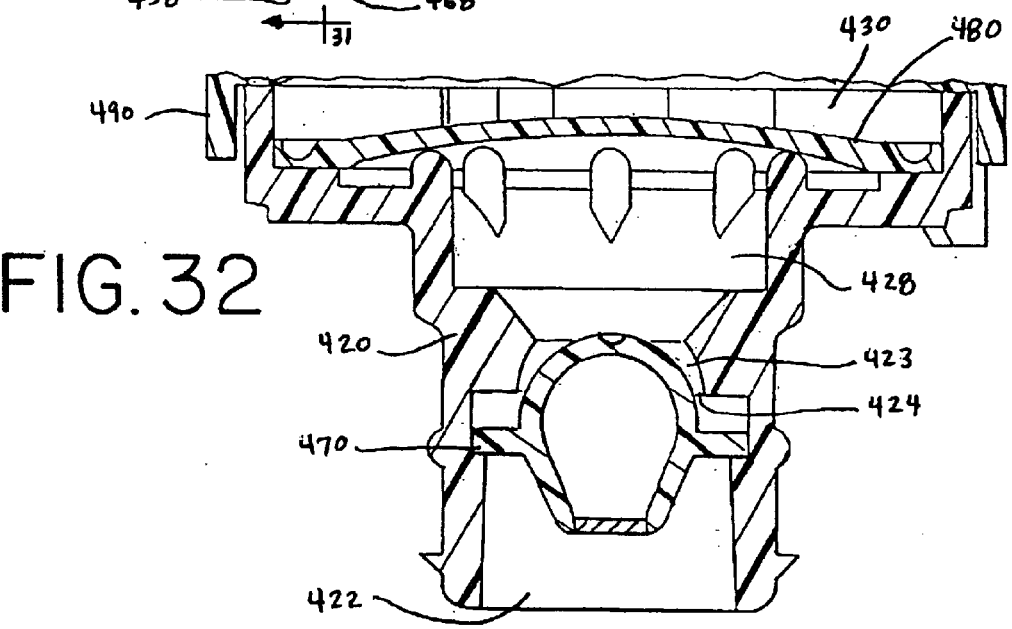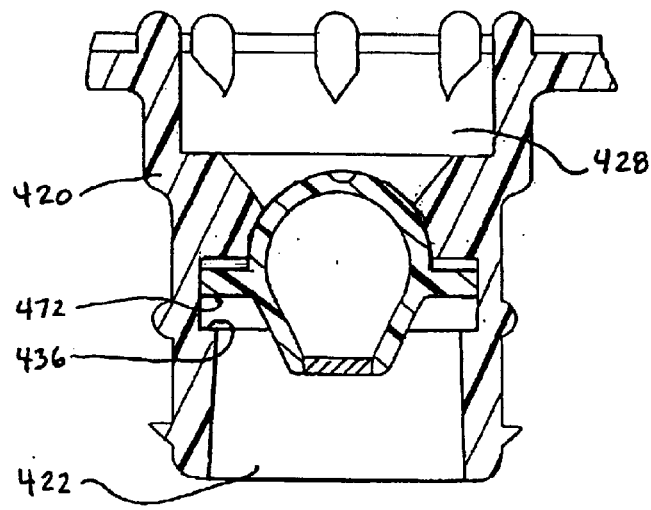

CHECK VALVE AND FILTER ASSEMBLY INCORPORATING SUCH VALVE, ESPECIALLY FOR WATER COOLER ASSEMBLIES

This application is a continuation in part patent application of application Ser. No. 10/175,462, filed Jun. 19, 2002, now abandoned, which is hereby incorporated by reference, which claims the benefit of U.S. Provisional application No. 60/301,375, filed Jun. 26, 2001, which is hereby incorporated by reference.

FIELD OF THE INVENTION

This invention relates to check valves, and in particular to check valves operative at a liquid and gas interface that closes to prevent a substantial flow of liquid beyond the valve but returns to a normally open position upon experiencing a slight vacuum from the liquid originating region, and filter assemblies incorporating such valves.

BACKGROUND OF THE INVENTION

Check valves in their broadest sense are well known for a variety of applications. One purpose of a check valve, such as when it is used in an area of a structure that experiences a liquid and gas interface, is to allow the egress of gas but to prevent the substantial flow of liquid. Such a purpose has been found useful, for example, in the area of water cooler design and fabrication.

In the field of bottled water coolers that are typically found in the home or office, a cooler housing supports an upwardly open reservoir that supplies users with water on demand via dispensing faucets or the like. The cooler housing and reservoir are designed to support a water bottle of three or five gallons (U.S.) capacity that is typically inverted to allow water to flow downwardly into the reservoir to a level sufficient to cover an open bottle mouth formed in the bottle neck. In normal operation, downward water flow from the bottle is accompanied by an upward exchange of air or gas from the reservoir into the bottle, and this gas-water exchange between the overlying bottle and the underlying reservoir continues until the water level of the reservoir rises sufficiently to cover the bottle mouth, at which point further air or gas exchange is halted and consequent downward water flow is stopped. As water is dispensed from the faucets that are supplied by the reservoir, the water level lowers to the point where the water level is below the bottle mouth, at which point the gas-water exchange may resume to enable additional water to flow downwardly into the reservoir. The general construction of water coolers is described in U.S. Pat. No. 6,167,921 B1 of Busick; U.S. Pat. No. 6,029,860 of Donselman; U.S. Pat. No. 6,003,318 of Busick; U.S. Pat. No. 6,123,232 of Donselman; U.S. Pat. No. 5,676,278 of Beyer; and U.S. Pat. No. 5,667,103 of Donselman, all of which are incorporated by reference herein.

The reservoir interior is typically designed to communicate with ambient air so that when the water level of the reservoir lowers due to typical water dispensing by users, ambient air takes its place prior to the gas-water exchange that replenishes the reservoir. Thus the upper reservoir chamber may be provided with an air filter so that air cannot enter the reservoir except by passing through the air filter medium. The description of such air filters in communication with water cooler reservoirs is found in U.S. Pat. No. 6,167,921 B1 to Busick and in U.S. Pat. No. 6,029,860 to Donselman, both of which are incorporated by reference herein. To protect such air filters from water flow and/or to prevent upward water flow therethrough in the event of reservoir overfilling, such as might occur with the use of a cracked bottle, an air filter unit may include a check valve in the air filter port, as can be found U.S. Pat. No. 6,167,921 B1 to Donselman, which appears to be a typical ball valve arrangement.

One problem that has now been encountered in the known check valves used in water cooler air filter units is that although these check valves may prevent the substantial flow of liquids beyond them, they are less than ideal in returning to their normally open position following the lowering of the liquid or water level of the reservoir. The known check valves that are manufacturable and cost effective suffer from valve sticking or valve structure distortion. This results in an internal pressure for any gas in the reservoir of substantially less than ambient, which has been found to substantially diminish the flow rate of dispensed fluids, such as water, from the dispensing faucets or outlets of the cooler. For example, it is believed that a known check valve comprising an imperforate disk and ring seal in a housing that includes an air filter media has experienced such a difficulty. Further, it is believed that the typical ball valve arrangement may suffer from similar disadvantages in performance, manufacturability and/or cost effectiveness.

Consequently there is a need for a cost effective and manufacturable check valve for a liquid—gas interface, that is normally open to permit gas passage but will close to substantially stop the flow of liquid in one direction and will reliably open to allow gas to flow in the other direction upon experiencing a low vacuum pressure differential across the valve structure from, for example, the reservoir of a water cooler, that may be of less than two inches (5.08 cm) of water column.

It would also be desirable if the check valve were readily manufacturable as a part of an air filter assembly, in which the check valve is so configured to protect the air filter from exposure to substantial quantities or flows of liquids, which unit is cost effectively constructed and simple to manufacture, so that the unit may have application in a typical water cooler or other such liquid dispensing structures that include a reservoir or the like.

BRIEF SUMMARY OF THE INVENTION

A check valve and filter assembly incorporating the same has been invented which provides the foregoing and following advantages and meets the above and below described needs, among others. In a first aspect, the invention is a normally open check valve for passing gas in a first direction, from an upstream side of the valve to a downstream side of the valve, and for passing gas in a reverse direction to the first direction, and for preventing liquid flow in the first direction, comprising a body member having a chamber with at least one side wall, an upstream and a downstream opening, the side wall including a tubular side wall portion having a diameter narrowing to at least a contact diameter as the chamber side wall extends upstream; a bell shaped member with a portion of the member received within the tubular chamber and having a mouth, a closed base, and a flexible wall extending between the mouth and the base that includes an annular portion of diameter greater than the contact diameter of the chamber side wall and greater than the perimeter of the mouth, wherein the specific gravity of the bell shaped member volume as defined by the mouth opening, the base and the wall therebetween is less than one and the mouth is disposed within the tubular chamber portion facing upstream and the base is generally downstream of the mouth; a retaining member affixed to the bell shaped member base, extending generally downstream from the bell shaped member base, and adapted to engage the chamber side wall downstream of the contact diameter; whereby the retaining member arrests movement of the bell shaped member when gas flows past the bell shaped member, and when liquid flows in the first direction past the mouth of the bell shaped member, the bell shaped member wall peripherally contacts the contact diameter of the chamber to thereby stop the flow of liquid past the bell shaped member.

In a second aspect, the invention is a normally open check valve for passing gas in a first direction, from an upstream side of the valve to a downstream side of the valve, and for passing gas in a reverse direction to the first direction, and for preventing liquid flow in the first direction, comprising a body member having a chamber with at least one side wall that includes a seating surface having a first diameter; a flexible synthetic resin bell shaped member having a closed end, a wall with a second exterior diameter greater than the seating surface first diameter and a throat with an inner diameter less than the second exterior diameter, wherein the specific gravity of the bell shaped member volume as defined by the throat, the base and the wall is less than one, and the bell shaped member is disposed in the chamber with the throat opening facing upstream and the base generally downstream of the mouth; a synthetic resin retaining member affixed to the bell shaped member base, extending generally downstream from the bell shaped member base, with a portion thereof extending laterally to the downstream direction adapted to engage the chamber side wall downstream of the seating surface; whereby the retaining member arrests downstream movement of the bell shaped member when gas flows in the direction reverse of the first direction, and the bell shaped member wall peripherally contacts the seating surface of the chamber at an initial seating wall portion to thereby stop the flow of liquid when liquid flows in the first direction past the seating surface.

In yet another aspect, the invention is an air filter assembly comprising a housing having a chamber with at least one side wall that includes a seating surface having a first diameter, with the chamber having an inlet and an outlet; a filtration medium affixed over the outlet of the housing chamber; a flexible synthetic resin bell shaped member having a closed end, a wall with a second exterior diameter greater than the seating surface first diameter and a throat with an inner diameter less than the bell shaped member second exterior diameter, wherein the specific gravity of the bell shaped member volume as defined by the throat, the base and the wall is less than one, and the bell shaped member is disposed in the chamber with the throat opening toward the chamber inlet and the base facing toward the chamber outlet; a synthetic resin retaining member monolithic with the bell shaped member base, extending generally toward the chamber outlet and further including a portion extending over the chamber outlet and adapted to engage a portion of the housing; whereby the retaining member arrests movement of the bell shaped member toward the chamber inlet when air flows through the filtration medium toward the chamber inlet, and the bell shaped member wall peripherally contacts the seating surface of the chamber at an initial seating wall portion to thereby stop the flow of liquid when liquid flows from the chamber inlet past the seating surface, to thereby provide a normally open check valve passing gas between the inlet and outlet, and preventing liquid flow through the filtration material.

In a further aspect, the invention is a normally open check valve for passing gas in a first direction, from an upstream side of the valve to a downstream side of the valve, and for passing gas in a reverse direction to the first direction, and for preventing liquid flow in the first direction, comprising a body member having a chamber with at least one side wall, an upstream and a downstream opening, the side wall including a side wall portion having a diameter narrowing to at least a contact diameter; a bell shaped member with a portion of the member received within the chamber and having a mouth, a closed base, and a flexible wall extending between the mouth and the base that includes an annular portion of diameter greater than the contact diameter of the chamber side wall and greater than the perimeter of the mouth, wherein the specific gravity of the bell shaped member volume as defined by the mouth opening, the base and the wall therebetween is less than one and the mouth is facing upstream and the base is generally downstream of the mouth; a retaining member affixed to the bell shaped member base, extending to engage the chamber side wall; whereby the retaining member arrests movement of the bell shaped member when gas flows past the bell shaped member and when liquid flows upstream of the bell shaped member, and the bell shaped member wall peripherally contacts the contact diameter of the chamber when liquid flows in the first direction.

In yet a further aspect, the invention is an air filter assembly comprising a housing having a chamber with at least one side wall that includes a seating surface having a first diameter, with the chamber having an inlet and an outlet; a filtration medium affixed over the outlet of the housing chamber; a flexible synthetic resin bell shaped member having a closed end, a wall with a second exterior diameter greater than the seating surface first diameter and a throat with an inner diameter less than the bell shaped member second exterior diameter, wherein the specific gravity of the bell shaped member volume as defined by the throat, the base and the wall is less than one, and the bell shaped member is disposed in the chamber with the throat opening toward the chamber inlet and the base facing toward the chamber outlet; a synthetic resin retaining member monolithic with the bell shaped member base and including a portion adapted to engage a portion of the housing; whereby the retaining member arrests movement of the bell shaped member toward the chamber inlet when air flows through the filtration medium toward the chamber inlet, and the bell shaped member wall peripherally contacts the seating surface of the chamber at an initial seating wall portion to thereby stop the flow of liquid when liquid flows from the chamber inlet past the seating surface, to thereby provide a normally open check valve passing gas between the inlet and outlet, and preventing liquid flow through the filtration material.

Preferred embodiments of the invention have the distinct advantage of providing a normally open check valve that permits gas passage but reliably closes to substantially stop the flow of liquid in one direction and that reliably opens to allow gas to flow in the other direction upon experiencing a low vacuum pressure differential across the valve structure. Moreover, at least in one embodiment, the check valve is of simple and economical design, but has good flow characteristics, and is readily manufacturable. Further, when used in a filter assembly, the cost of a check valve is very important to the overall assembly cost. Moreover, at least in one embodiment, the filter assembly is of economical and simple design, has acceptable flow characteristics, and is also readily manufacturable.

Other features and advantages of the present invention will become more fully apparent from the following description of the preferred embodiments, the appended claims and the accompanying drawings.

BRIEF DESCRIPTION OF SEVERAL VIEWS OF THE DRAWINGS

FIG. 1 is a top plan view of an embodiment of a filter assembly and an embodiment of a check valve.

FIG. 2 is a cross-sectional view taken along line 2—2 of FIG. 1 and showing the embodiment of the check valve in its normally open position.

FIG. 5 is a top plan view of an embodiment of a housing member.

FIG. 6 is a side view of the embodiment of a housing member of FIG. 5.

FIG. 7 is a cross-sectional view taken along line 7—7 of FIG. 6.

FIG. 17 is an exploded cross-sectional view of another partially assembled embodiment of a filter assembly and another assembled embodiment of a check valve showing the check valve in a closed position.

FIG. 29 is a top plan view of still another embodiment of a check valve member for incorporation into an embodiment of a housing member.

FIG. 30 is a cross-sectional view taken along line 30—30 of FIG. 29.

FIG. 31 is a cross-sectional view taken along line 31—31 of FIG. 30.

FIG. 32 is a cross-sectional view, with a portion broken out, showing a filter assembly and embodiment of the check valve of FIGS. 29–31 in its normally open position.

FIG. 33 is the same view as FIG. 32, with a portion broken out, showing an embodiment of the check valve of FIGS. 29–31 in a closed position.

DETAILED DESCRIPTION OF THE DRAWINGS AND PREFERRED EMBODIMENTS OF THE INVENTION

Figure 3:
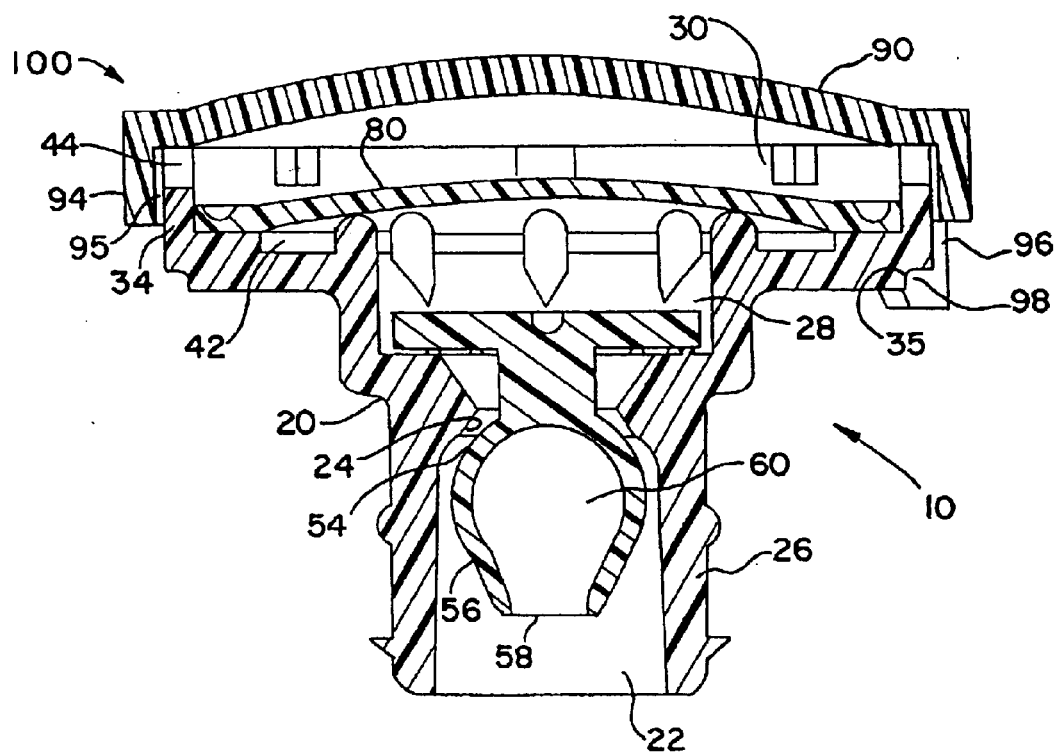
FIG. 3 is a cross-sectional view taken along line 3—3 of FIG. 1 and showing the embodiment of the check valve in its normally open position.

An embodiment of a check valve 10 and filter assembly 100 is shown in FIGS. 1 through 4. As shown in FIGS. 5 through 13, the check valve 10 and filter assembly 100 is constructed from housing member 20, bell shaped check valve member, filtration media 80, and cover 90.

With reference to FIGS. 2, and 5 through 7, the housing member 20 has an inlet 22 that communicates with a check valve seat 24, that in turn communicates with a downstream chamber 28. Downstream chamber 28 in turn communicates with outlet 30. Inlet 22 and valve seat 24 are defined by inlet wall 26, and inlet wall 26 transitions to chamber wall 32, that in turn transitions to outlet wall 34. Downstream of check valve seat 24 is retaining wall 36, and adjacent outlet wall 34 is filter affixation ledge 38.

In the embodiment of housing member 20 depicted in FIGS. 5 through 7, one or more projections 40 and groove 42 are optionally provided between filter affixation ledge 38 and chamber wall 32. Also, one or more outlet channels 44 are optionally provided in outlet wall 34. Further, one or more retaining projections 46 are optionally provided on retaining wall 36.

Figure 8:
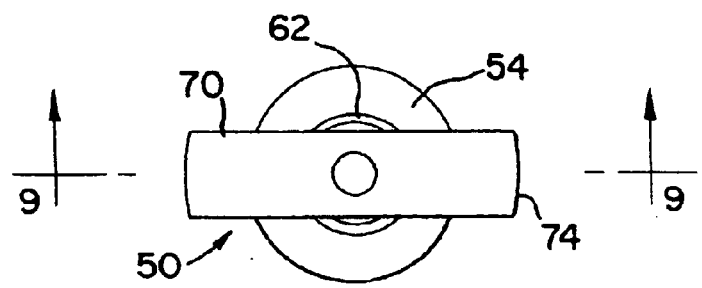
FIG. 8 is a top plan view of an embodiment of a check valve member for incorporation into an embodiment of a housing member.
Figure 9:
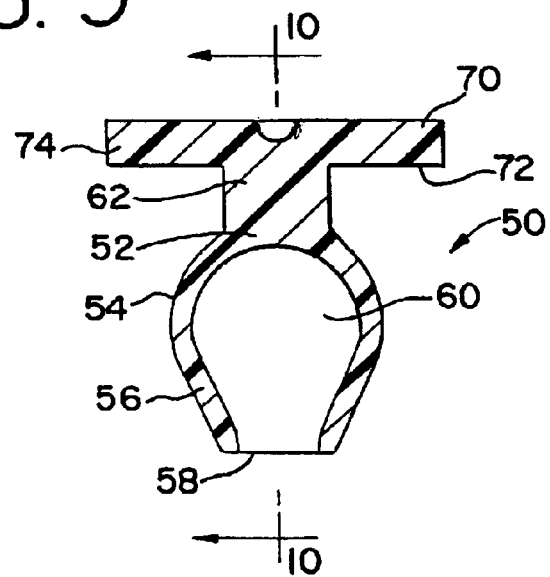
FIG. 9 is a cross-sectional view taken along line 9—9 of FIG. 8.
Figure 10:
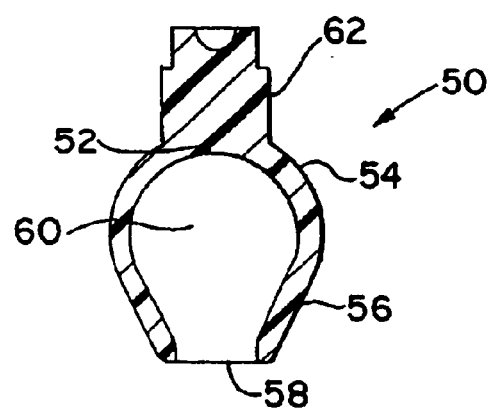
FIG. 10 is a cross-sectional view taken along line 10—10 of FIG. 9.

With reference to FIGS. 8 through 10, an embodiment of a bell shaped check valve member 50 is shown. Bell shaped check valve member 50 includes base 52 that transitions to a valve seat section 54 which is configured to conform to check valve seat 24 of housing 20. Valve seat section 54 in turn transitions to throat section 56 that terminates in throat entrance or mouth opening 58, and thereby defines chamber 60. Further, bell shaped check valve member 50 is provided with retaining member 70 that includes retaining surface 72.

Figure 11:
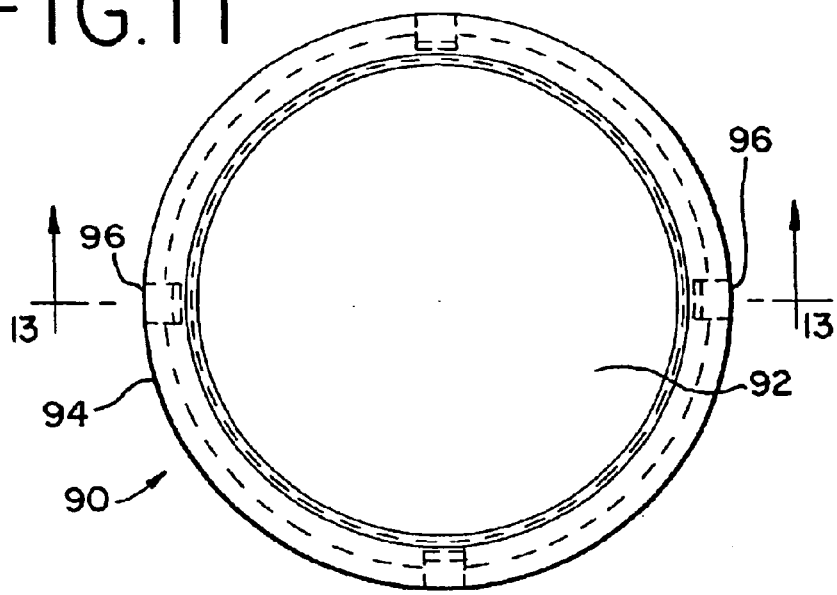
FIG. 11 is a top plan view of an embodiment of a cover member.
Figure 12:
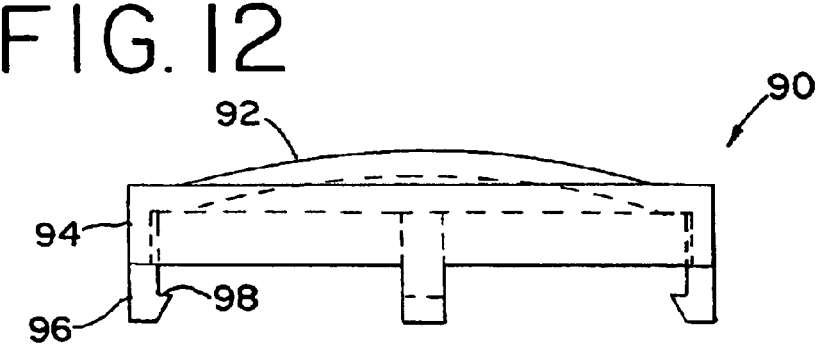
FIG. 12 is a side view of the embodiment of a cover member of FIG. 11.
Figure 13:
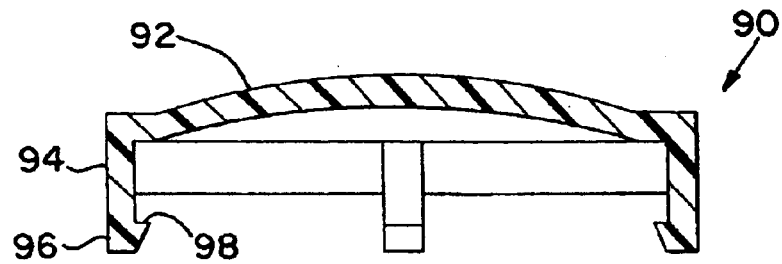
FIG. 13 is a cross-sectional view taken along line 13—13 of FIG. 11.

With reference to FIGS. 11 through 13, an embodiment of a cover member 90 is depicted. Cover member 90 includes top wall 92 and side wall 94. In the preferred embodiment of cover member 90, there is also provided one or more tabs 96 projecting from the interior of side wall 94 and extending outwardly from side wall 94. Further provided in the preferred embodiment of tabs 96 latches 98 that may snap lock into corresponding recess 35 in outlet wall 34 of housing member 20 when filter assembly 100 is fully assembled (see, e.g., FIG. 2).

Check valve 10 can be constructed by taking housing member 20 and inserting bell shaped check valve member 50 through inlet 22 and oriented such that retaining member 70 is the first portion to enter inlet 22. Inasmuch as the preferred material of construction for the bell shaped member 50 is a flexible synthetic resin, retaining member 70 deforms to permit the passage thereof beyond valve seat 24 and into downstream chamber 28 during the insertion. An assembled check valve 10 is thereby created when the retaining member 70 fully clearing valve seat 24 and fully extending into chamber 28, and before valve seat section 54 of bell shaped member 50 fully abuts against valve seat 24 of housing 20.

Filter assembly 100 can be constructed by taking housing member 20 and affixing thereto filtration media 80, using a known method such as sonic welding. For example, in the preferred embodiment, filtration media 80 is sonically welded onto filter affixation ledge 38. Other mechanisms for affixing filtration media 80 to housing 20 known by those of ordinary skill in the art are also contemplated herein, including glue, hot glue, insert molding, hot melting, heat staking, and the like. The resulting affixation may be either a continuous or discontinuous affixation bead, although it is presently preferred to have a continuous bead affixation bead to assist with filtration efficiency. Either before or after the affixing of filtration media 80 to housing 20, check valve 10 may be constructed as noted directly above, to result in a filter assembly 100, although it is presently preferred that check valve 10 is assembled first followed by affixation of filtration media 80 to housing 20.

It is to be noted that the cover member 90 is an optional feature of the filter assembly 100. Nevertheless, it is presently preferred to add cover member 90, and to do so by pressing cover member 90 over housing outlet 30, following affixation of filtration media 80, such that latches 98 snap fit into recesses 35. Cover member embodiment 90 may be of assistance in fabricating the filter assembly in that it assists in maintaining the filter integrity during manufacture, handling, and installation. Further, in the preferred embodiment, top wall 92 and outlet channels 44 assist in providing a lower tendency of liquids to wick into the filtration material or other ambient materials, such as dust and like, to accumulate on the filtration material leading to a less than ideal filter assembly life. It should be noted that other mechanisms for retaining cover member 90 onto housing 20 are known by those of ordinary skill in the art are also contemplated herein, including glue, hot glue, insert molding, hot melting, heat staking, and the like.

In use, check valve 10 is a normally open check valve (e.g., FIG. 3) permitting air or gas to pass from a downstream inlet, such as inlet 22 to an upstream outlet, such as outlet 30, and in a reverse direction as well. In this state, as depicted in FIG. 3, gas or air passes around valve seat section 54 of bell shaped check valve member 50 and valve seat 24, and around retaining member 70 in chamber 28. Typically, in this normally open state permitting air flow about the check valve member 50, at least a portion of retaining member 70 abuts against or is otherwise adjacent to retaining wall 36. When there is a liquid—gas, or water—air, interface that approaches and contacts bell shaped check valve member 50, the construction of the portion of the bell shaped check valve member 50 enveloped by the liquid is such that a buoyant and/or dynamic force is applied to move the valve member against a portion of the housing chamber until the member seats, that is where valve seat section 54 of check valve member 50 seals against seat 24 (e.g. FIG. 4). By this manner of operation, the check valve 10 prevents a liquid or water flow from the inlet 22 to the outlet 30. However, when the liquid—gas or water—air interface recedes from valve seat 24 (such as, for example when a water overflow condition is no longer present in a water cooler reservoir), there will eventually be created a pressure differential between the upstream side (the volume adjacent inlet 22) of the seated check valve and the downstream side (the volume adjacent chamber 28) to force the check valve assembly into its normally open state (e.g. FIG. 3).

In the preferred embodiment of bell shaped check valve member 50, chamber 60 and throat entrance or mouth opening 58 are configured such that chamber 60 captures and retains a gas when the check valve throat entrance or mouth opening 58 is exposed to a liquid—gas interface, and in particular chamber 60 may retain air when throat entrance or mouth opening 58 is exposed to an air—water interface. The resulting gas or air bubble in chamber 60 thereby assures the specific gravity of the structure thereafter extending into a liquid to be below one, and thereby providing a buoyancy and/or dynamic force exerted on the bell shaped check valve member to assure a satisfactory seat between valve seat section 54 of bell shaped check valve 50 and check valve seat 24 of housing member 20. However, as noted below, chamber 60 may be provided with other buoyant materials and/or throat entrance 58 may be modified to accomplish this operation.

Further, in the preferred embodiment retaining surface 72 of retaining member 70 bears against retaining wall 36 when the check valve is in its normally open state. Either or both of retaining surface 72 and retaining wall 36 may be textured such as is known in the art to prevent sticking of the retaining surface 72 to retaining wall 36 during operation. Additionally, and as presently preferred, retaining wall 36 is provided with retaining projections 46 that contact retaining surface 72 to prevent sticking. In addition, although retaining member 70 includes opposed lateral portions 74 in the preferred embodiment, one or more than 2 lateral portions, each of various angular orientations as can be readily appreciated by those of ordinary skill in the art are also contemplated herein to construct a retaining member 70 that can bear against a portion of a housing member to retain check valve member 50 within housing member 20.

Furthermore, and in the preferred embodiment, bell shaped check valve member 50 is also provided with stem 62 extending between base 52 and retaining member 70 and housing member 20 is also provided with transition wall section 25. These additional features are optional but provided in the preferred embodiment to enable the check valve member 50 to easily translate along the flow path traveling between the upstream end (adjacent inlet 22) and the downstream end (adjacent outlet 30) of the assembly as well as allow for some latitudinal displacement of the check valve member 50 relative to this flow path under normal operating conditions. With these preferred embodiment features it is believed that the check valve 10 may operate for its intended purpose from a vertical orientation (such as is depicted in FIG. 2) to and including at least a horizontal orientation (such as oriented at about 90 degrees from that depicted in FIG. 2).

Still further, and with reference to FIGS. 5 through 7, housing member 20 may be provided with various sealing means adjacent inlet 22, such as sealing flange 48. Other sealing means readily appreciated by those of ordinary skill in the art are also contemplated herein such as an interference fit sizing of inlet wall 26 exterior or interior, a threaded portion on the interior or exterior of inlet wall 26, an external or internal O-ring provided on inlet wall 26, or other such gasket structure provided thereon, among other things. An optional boss 49, such as that provided on the preferred embodiment as shown in FIGS. 5 through 7, may also be provided to assist in proper positioning of the assembly inlet onto a vent that is normally used for gas or air but that permits the liquid—gas or water—air interface to be introduced into the check valve assembly 10.

Figure 4:
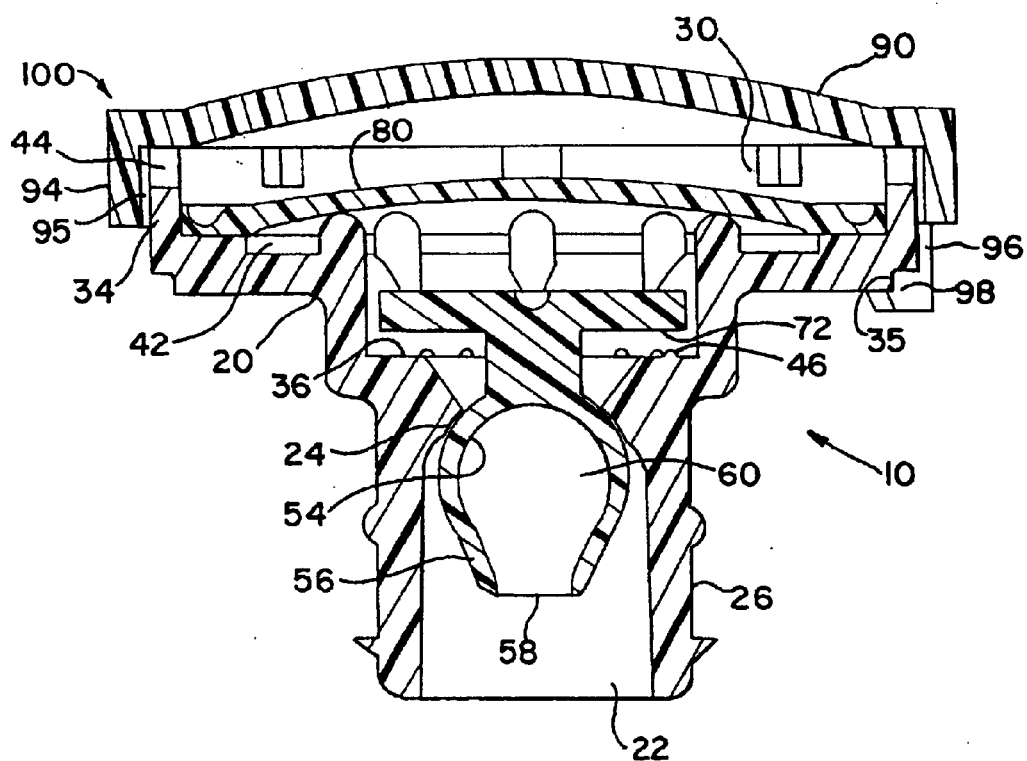
FIG. 4 is the same view as FIG. 3, except that the embodiment of the check valve is shown in its closed position.

As to the operation of filter assembly 100, this assembly incorporates check valve assembly 10, and consequently its operation parallels the foregoing discussion on the operation of the check valve assembly 10. Filtration media 80 in the preferred embodiment is an air filter that provides insubstantial impediment to ingress and egress of gas or air into chamber 28. In the preferred embodiment, projections 40 are provided in conjunction with groove 42 to maximize surface area for this gas or air flow. Furthermore, in the preferred embodiment, as depicted in FIGS. 3 and 4, air is permitted to flow from filtration media 80 into the head space between media 80 and cover 90 top wall 92. This flow continues over outlet wall 34 via outlet channels 44, and to outside the structure through gap 95 between side wall 94 and outlet wall 34, as provided by projecting tabs 96. Such a flow of gas or air would occur when the filter assembly 100 is connected to a liquid or water reservoir and the reservoir is filled with liquid or water that displaces the gas or air out of the head space of the reservoir. As noted above, check valve 10 incorporated therein operates to preserve the integrity of filtration media 80 if bell shaped check valve member 50 encounters a liquid—gas interface or water—gas interface, by sealing the valve seat section 54 to valve seat 24 due to buoyant and/or dynamic forces associated with the liquid or water.

The filter assembly 100 further permits a reverse flow of gas or air when the check valve assembly 10 is incorporated therein and is in, or returns to, a normally open position as described above. In such a state, air or gas is permitted to flow through gap 95 between side wall 94 and outer wall 34 and over outer wall 34 via outlet channels 44 and into the head space between top wall 92 and filtration media 80. This reverse flow passes through the filtration media 80, which filters the air or gas, and enters into downstream chamber 28, and then passes over retaining member 70 and between check valve seat 24 and valve seat section 54 to thereby pass through inlet 22. In the preferred embodiment, such a reverse flow of gas or air would occur when the filter assembly 100 is connected to a liquid or water reservoir and the reservoir is emptied of liquid or water to thereby draw the gas or air into the head space of the reservoir. Due to the bell shaped check valve member, the filter assembly is less prone to restricting this reverse air flow due to the check valve sticking in the closed position, and thus water flow from a vented reservoir to which the preferred embodiment of the filter assembly is attached is improved over other known filter assemblies.

Figure 15:
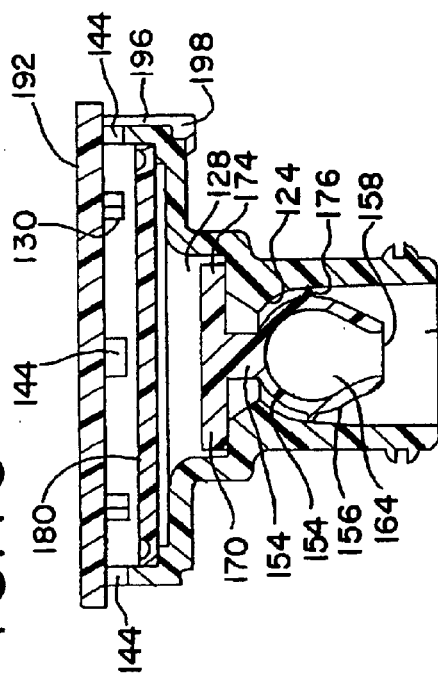
FIG. 15 is a cross-sectional view of the assembled embodiments of FIG. 14 showing the check valve in its normally open position.
Figure 16:
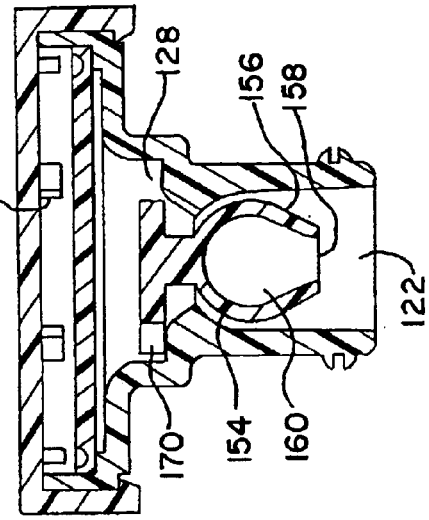
FIG. 16 is a cross-sectional view of the assembled embodiments of FIG. 14 showing the check valve in its normally open position and taken from a different angular view from that of FIG. 15.
Figure 14:
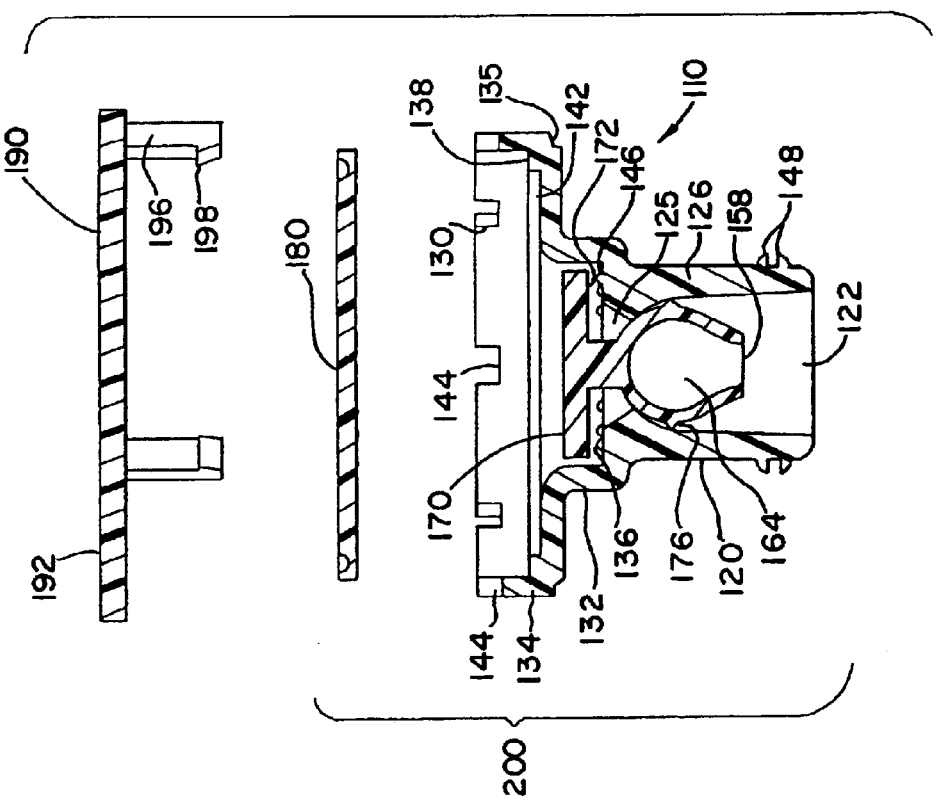
FIG. 14 is an exploded cross-sectional view of another partially assembled embodiment of a filter assembly and another assembled embodiment of a check valve showing the check valve in a closed position.
Figure 18:
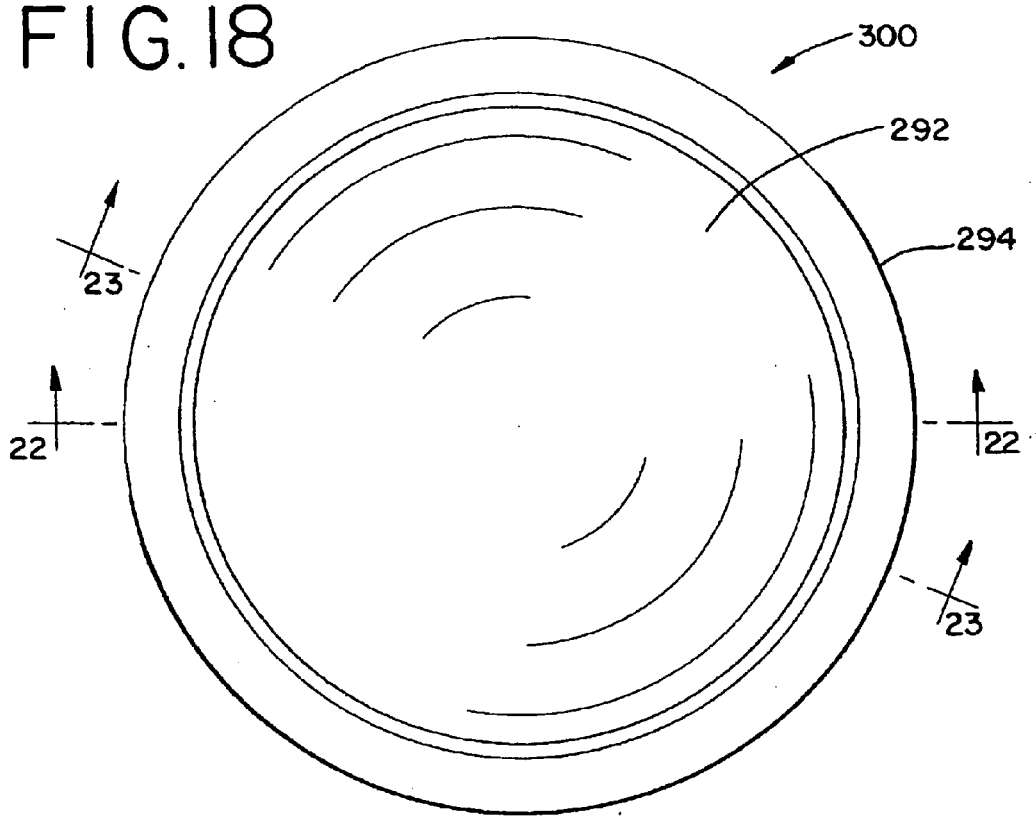
FIG. 18 is a top plan view of the embodiment of a filter assembly and the embodiment of a check valve of FIG. 17.
Figure 19:
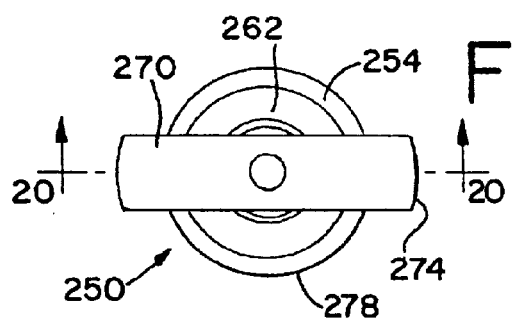
FIG. 19 is a top plan view of another embodiment of a check valve member for incorporation into an embodiment of a housing member.
Figure 20:
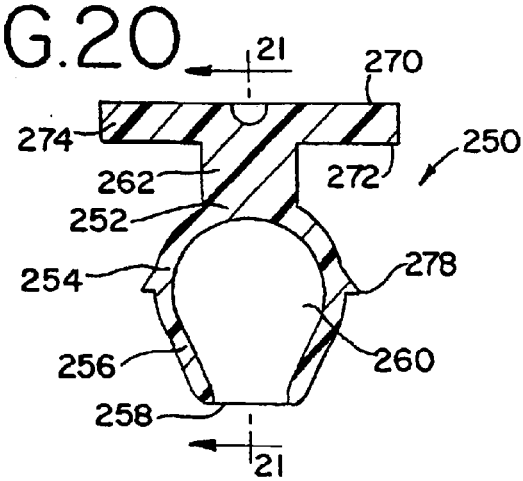
FIG. 20 is a cross-sectional view taken along line 20—20 of FIG. 19.
Figure 21:
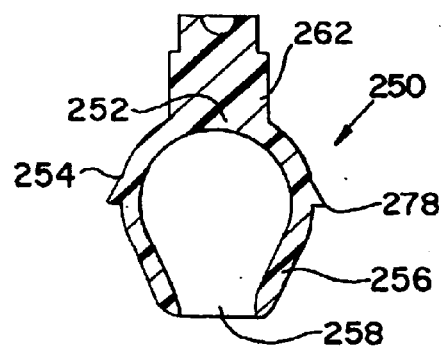
FIG. 21 is a cross-sectional view taken along line 21—21 of FIG. 20.
Figure 22:
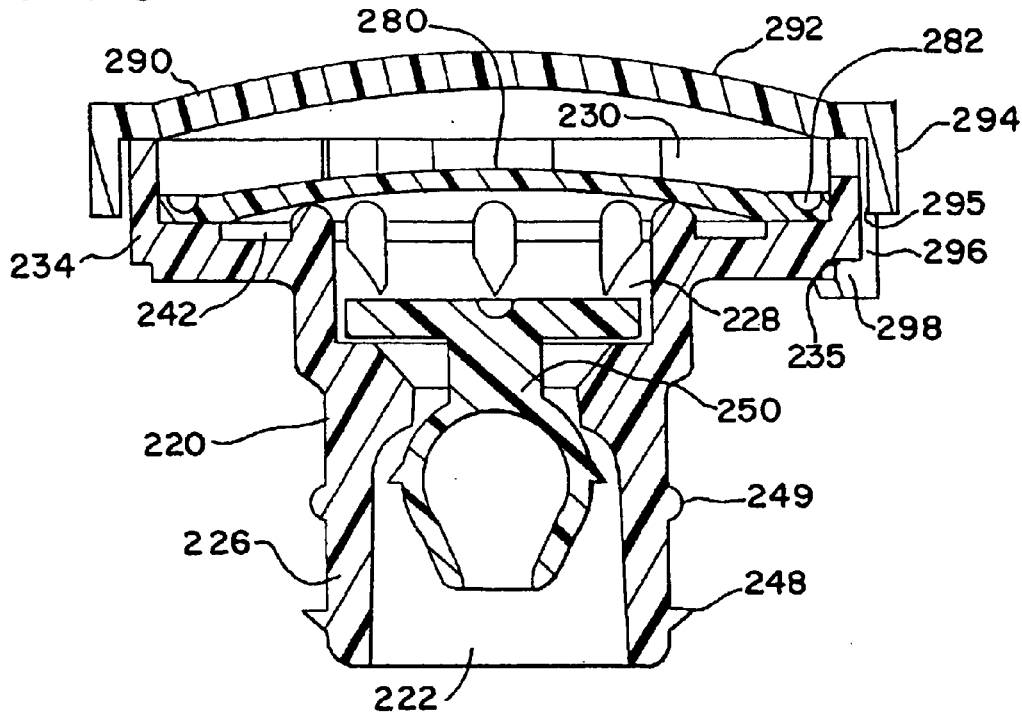
FIG. 22 is cross-sectional view taken along line 22—22 of FIG. 18.
Figure 23:
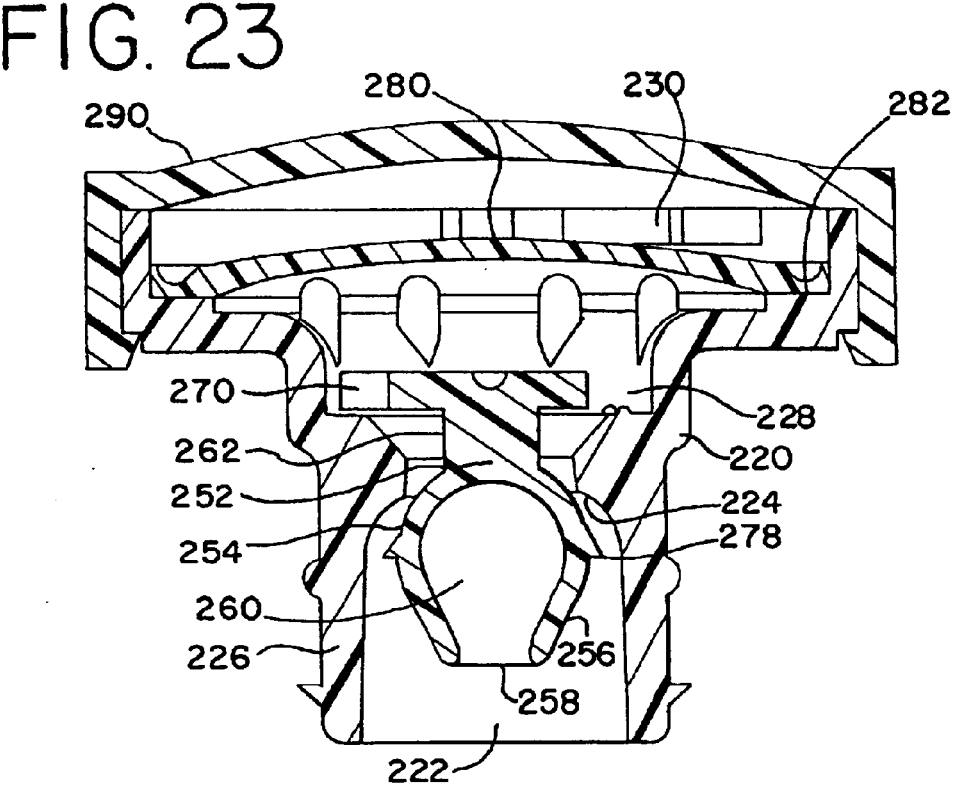
FIG. 23 is a cross-sectional view taken along line 23—23 of FIG. 18.
Figure 24:
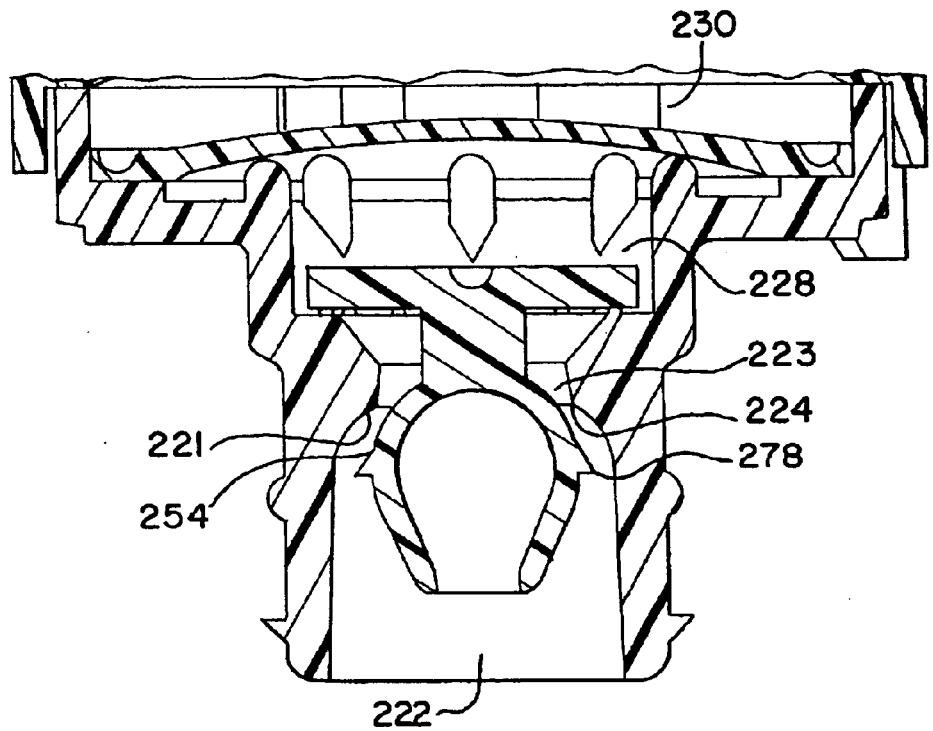
FIG. 24 is the same view as FIG. 22, with a portion broken out, showing an embodiment of the check valve in its normally open position.
Figure 25:
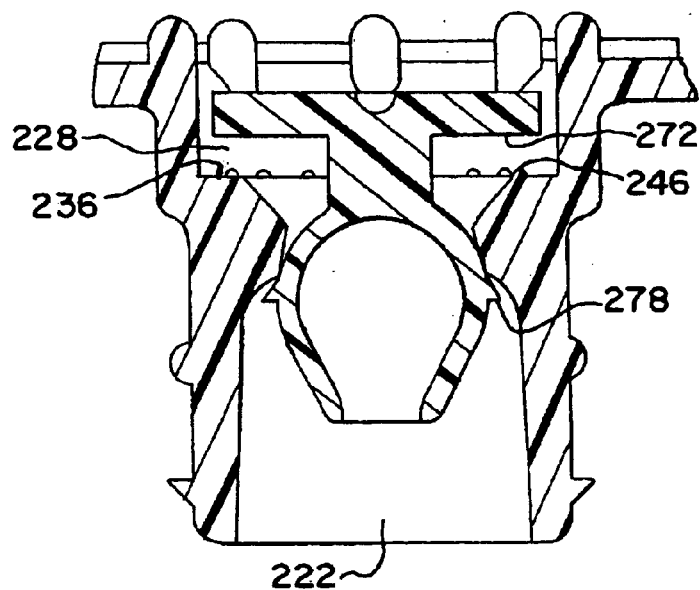
FIG. 25 is the same view as FIG. 24, with a portion broken out, showing an embodiment of the check valve in a closed position.

By way of further example, and with reference to FIGS. 14 through 16, a second alternative check valve assembly 110 and filter assembly 200 is shown in various cross-sections. This alternative embodiment is similar in structure and operation to the above described embodiments in the preceding figures, and accordingly these similar features have been denoted by numerical designations incremented by 100. Housing member 120 has similar features as that of housing member 20, but with slight design modifications. For example, valve seat 124 is a continuous curvature surface portion of inlet wall 126, and groove 142 transitions immediately into cavity 128. Further, sealing flange 148 is comprised of multiple ridges about inlet 122. Otherwise, the other features of housing member 120 are similar to those described herein with respect to FIGS. 1 through 13 and have thus been incremented by 100. This incrementing convention of feature designations has also been applied to filter media 180 and cover member 190 because their features are also similar to those described herein with respect to FIGS. 1 through 13.

As to the embodiment of check valve member 150 shown in FIGS. 14 through 16, this alternative is similar to the above described embodiment of check valve member 50, and accordingly these similar features have been denoted by numerical designations incremented by 100 with respect to the check valve member of FIGS. 2 through 4 and 8 through 10. In addition, disposed between throat section 156 and valve seat section 154 of this member are one or more discontinuous flanges 176, configured as either ball-like or rib-like structures. This additional feature of this embodiment, discontinuous flange 176, is of further benefit over that of the previously described embodiments in that the discontinuous flange 176 is believed to further assist bell shaped check valve member 150 from sticking in the closed position during operation as described above and prevents this member from traveling an excessive distance into chamber 128 due to excessive pressures exerted by liquids entering from inlet 122. Still further, it is believed that discontinuous flange 176 acts as a guide and assists the bell shaped check valve member to properly position itself before actuation so that the valve seat section 154 is located adjacent to valve seat 124, and thereby promote a favorable sealing therebetween during valve actuation. Thus, it is believed that discontinuous flange 176 further assists check valve assembly 110 effectiveness in vertical through and including horizontal orientations.

Further, and with reference to FIGS. 17 through 25, a third alternative and presently preferred embodiment of check valve assembly 210 and filter assembly 300 is shown. As is readily noted from these figures, many of the features of housing or body member 220 are similar to the features of housing member 20 (see, e.g., FIGS. 5 through 7) and housing member or body member 120 (see FIGS. 14 through 16) and accordingly these similar features have been denoted by numerical designations incremented by 200 with respect to housing member 20 and by 100 with respect to body member 120. Of further note with respect to this preferred embodiment is that inlet 222 has a slightly greater diameter than that of the above embodiments and valve seat 224 includes a continuous curvature surface portion of inlet wall 226 (denoted 221, e.g. FIG. 24) and the intermediate wall section 223 and transition or joint therebetween.

With reference to FIGS. 19 through 25, a third alternative and presently preferred embodiment of bell shaped check valve member 250 is shown. As is readily noted from these figures, many of the features of this embodiment are similar to the features of the embodiment of member 50 (see, e.g., FIGS. 3, 4, and 8 through 10) and member 150 (see FIGS. 14 through 16) and accordingly these similar features have been denoted by numerical designations incremented by 200 with respect to member 50 and by 100 with respect to body member 150. Of further note with respect to this preferred embodiment is that disposed between throat section 256 and valve seat section 254 of this member 250 is continuous flange 278. As can be appreciated with specific reference to FIGS. 24 and 25, continuous flange 278 has the further advantageous attribute of providing a secondary valve seat section in addition to the primary valve seat section 254. This additional feature is believed to provide the check valve assembly 210 with further robustness when a higher than normal pressure differential is experienced. Under such circumstances, such as in the preferred embodiment when there is a greater than 1 p.s.i.g. pressure differential is presented from a liquid or water reservoir overfill condition in a water cooler by way of inlet 222, bell shaped check valve member 250 may travel further upstream, and thus a seal can be established between continuous flange 278 and check valve seat 224, which may include both intermediate wall section 223 and continuous curvature surface portion 221 (see, e.g., FIG. 24). Thus it is believed that continuous flange 278 may operate as a secondary valve seat for high pressure and other unusual operating conditions. Additionally, as similarly noted above with respect to discontinuous flange 176, it is believed that continuous flange 278 operates as a stop mechanism to prevent bell shaped check valve member 250 from sticking into a normally closed position during operation, and acts as a guide for the member 250 during operation so that the check valve assembly may operate in a range of orientations or positions, through and including between a vertical position and a horizontal position. For these and other advantageous reasons readily appreciated by those of ordinary skill in the art, bell shaped check valve member 250 with continuous flange 278 is presently preferred.

As for the operation of the embodiment of check valve assembly 210, it generally conforms to that described above with respect to the embodiments of FIGS. 1 through 13. Similarly, as to the operation of the embodiment of filter assembly 300, it generally conforms to that described above with respect to the embodiments of FIGS. 1 through 13. Accordingly the construction and operation of the embodiments of assemblies 210 and 300 will not be repeated herein. It is to be noted, however, that these assemblies 210 and 310 have further advantageous features, as noted immediately hereinabove.

With reference to FIGS. 29 through 33, a fourth alternative of bell shaped check valve member 250 is shown. As is readily noted from these figures, many of the features of this embodiment are similar to the features of the embodiment of member 50 (see, e.g., FIGS. 3, 4, and 8 through 10) and member 150 (see FIGS. 14 through 16) and accordingly these similar features have been denoted by numerical designations incremented by 400 with respect to member 50 and by 300 with respect to body member 150. Disposed between mouth opening 465 and valve seat section 454 of this member 450 is retaining member 470 with retaining surface 472, which bears against retaining wall 436 when in the check valve is in its normally open state. Retaining member 470 may comprise one or more extensions running generally perpendicular to the anticipated liquid flow in the assembly. Retaining surface 472 may be textured or non-uniformly surfaced as is known in the art to prevent sticking of the retaining surface 472 to retaining wall 436 during operation, and retaining wall 436 may be similarly textured or non-uniformly surfaced. Retaining wall 436 can be a part of one or more appropriately located slots in the body member running generally parallel to the anticipated liquid flow in the assembly, or it can be a part of an annular recess in housing 420, and retaining wall 436 can be molded into housing 420 or machined by methods known to those of ordinary skill, including by peening or other secondary process. Further, it should be noted that a flange, either continuous or discontinuous as discussed in detail with respect to the other embodiments, may be located on bell shaped member 410, such as on and/or between retaining member 470 and seating section 454.

As for the operation of the embodiment of check valve assembly 410, it generally conforms to that described above with respect to the embodiments of FIGS. 1 through 13. Similarly, as to the operation of the associated filter assembly embodiment shown in FIGS. 32–33, it generally conforms to that described above with respect to the embodiments of FIGS. 1 through 13. Accordingly the construction and operation of these embodiments of the assemblies will not be repeated herein. It is to be noted, however, that these assemblies have further advantageous features, as can be readily appreciated.

With reference to FIGS. 34 through 37, a firth alternative embodiment of bell shaped check valve member 550 is shown. As is readily noted from these figures, many of the features of this embodiment are similar to the features of the embodiment of member 250 and accordingly these similar features have been denoted by numerical designations incremented by 300 with respect to member 250 and by 400 with respect to body member 150. Disposed between throat section 556 and valve seat section 554 of this member 550 is continuous flange 578. As noted above with respect to the embodiment of FIGS. 24 and 25, flange 578 has several advantageous attributes, which will not be repeated, but it is noted that discontinuity in the flange may provide further benefit in some conditions. Disposed below seating surface 554, and preferably below mouth opening 565 is retaining member 570 with retaining surface 572, which bears against retaining wall 536 when the check valve is in its normally open state. Retaining member 570 may comprise one or more extensions running generally perpendicular to the anticipated liquid flow in the assembly, and is preferably annular and attached to bell shaped member 550 by one or more runners or legs 571. Retaining surface 572 may be textured or non-uniformly surfaced as is known in the art to prevent sticking of the retaining surface 572 to retaining wall 536 during operation, and retaining wall 536 may be similarly textured or non-uniformly surfaced. Retaining wall 536 can be a part of one or more appropriately located slots in the body member running generally parallel to the anticipated liquid flow in the assembly, or it can be a part of an annular recess in housing 520, and retaining wall 536 can be molded into housing 520 or machined by methods known to those of ordinary skill, including by peening or other secondary process.

As for the operation of the embodiment of check valve assembly 510, it generally conforms to that described above with respect to the embodiments of FIGS. 1 through 13. Similarly, as to the operation of the filter assembly embodiment, it generally conforms to that described above with respect to the embodiments of FIGS. 1 through 13.

Accordingly the construction and operation of these embodiments will not be repeated herein. It is to be noted, however, that these assemblies have further advantageous features, as can be readily appreciated.

Figure 26:
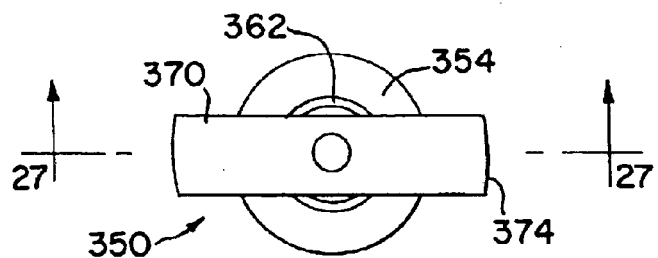
FIG. 26 is a top plan view of yet another embodiment of a check valve member for incorporation into an embodiment of a housing member.
Figure 27:
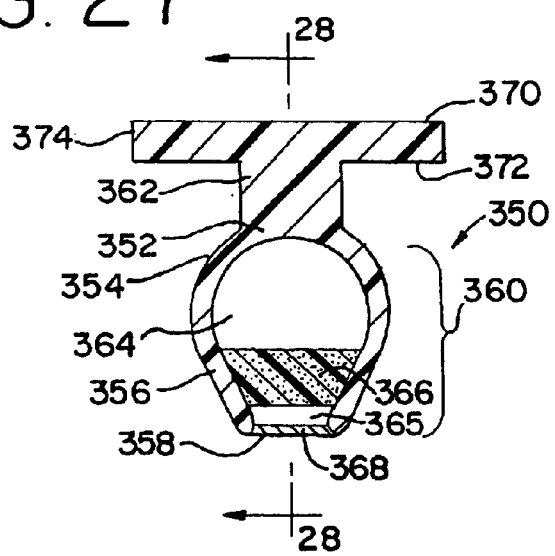
FIG. 27 is a cross-sectional view taken along line 27—27 of FIG. 26.
Figure 28:
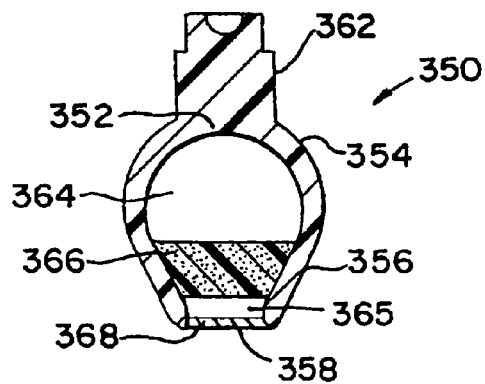
FIG. 28 is a cross-sectional view taken along line 28—28 of FIG. 27
Figure 34:
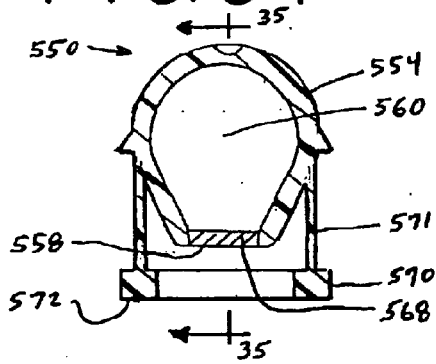
FIG. 34 is a cross-sectional view of yet another embodiment of a check valve member for incorporation into an embodiment of a housing member.
Figure 35:
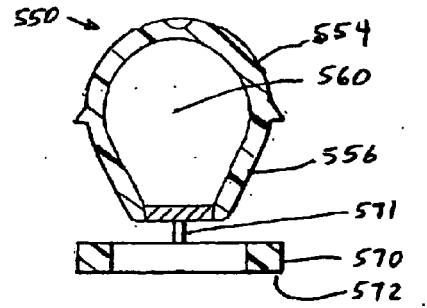
FIG. 35 is a cross-sectional view taken along line 35—35 of FIG. 34.
Figure 36:
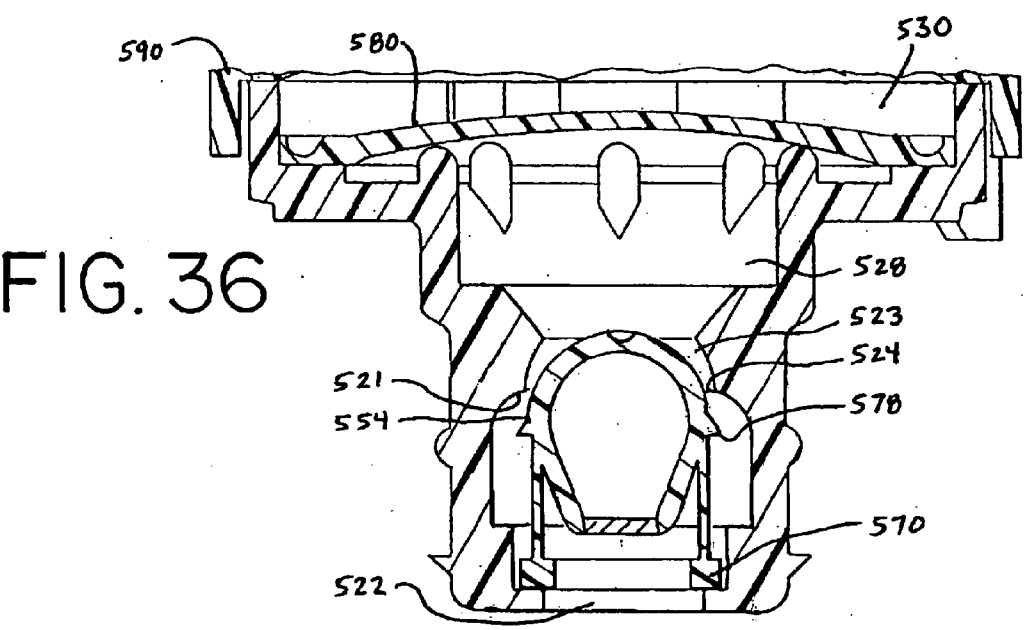
FIG. 36 is a cross-sectional view, with a portion broken out, showing a filter assembly and embodiment of the check valve of FIGS. 34–35 in its normally open position.
Figure 37:
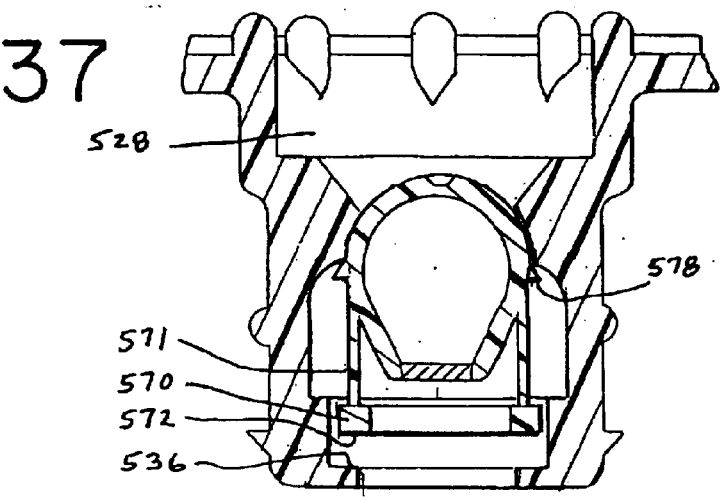
FIG. 37 is the same view as FIG. 36, with a portion broken out, showing an embodiment of the check valve of FIGS. 34–35 in a closed position.

It is to be further noted that all of the bell shaped check valve member embodiments disclosed herein may optionally have chambers 60, 160, 260, 460, 560 partially or completely filled with a foamed synthetic resin, such as foamed polystyrene, foamed polyethylene, foamed urethane or other such foamed synthetic resin materials well known in the art to make the member structure that is wetted by liquid or water have a specific gravity of less than one and thereby facilitate the applicable buoyant and/or dynamic forces to seal the check valve member against the housing or body member. Alternatively, or in combination with the foamed synthetic resin material in the chambers 60, 160, 260, 460, 560 a thin synthetic resin member may be placed over the throat entrances or mouth openings 58, 158, 258, 458, 558 of the bell shaped check valve member embodiments. This thin member may be of a cap over the throat entrance and/or plug in the throat entrance, and may be of any synthetic resin suitable for suitable for the fluid and operating temperature of the check valve assembly, such as silicone, nylon, polyethylene or polyester. By way of example only, and as shown in FIGS. 26 through 28, there is provided within cavity 360 foamaceous synthetic resin 366, which also retains an air bubble 64 within cavity 360. Further, and by way of example only, as shown in FIGS. 26 through 28, there is provided thin synthetic resin member 368 over throat entrance 358, which also retains an air bubble 365. It is to be appreciated that the size of the air bubble retained by the thin synthetic resin member may be as large as cavity 360, less the volume that may be occupied by the thin synthetic resin member 368, when a bell shaped check valve assembly is constructed without foamaceous material is not located within cavity 360. As is the convention herein, other features of the previously discussed check valve embodiments that are similar to those features of the embodiment of FIGS. 26 through 28 are denoted by the same last two digits, and incremented by 100 or multiples thereof for the sake of brevity of description.

The bell shaped check valve member embodiments 50, 150, 250, 350, 450, 550 disclosed herein may be constructed of any suitable synthetic resin material, and the preferred embodiment is preferably a flexible synthetic resin to allow for deformation of the member for proper sealing against the check valve seat 24, 124, 224, 424, 524 of a housing member or body member that defines the chamber for operation of the check valve assembly, as well as proper unsealing when a low pressure differential (such as one to two inches (5.08 cm) of water column) is experienced on either side of the sealing surface 24, 124, 224 of the valve. For example, bell shaped check valve members 50, 150, 250, 350, 450, 550 may be composed of nylon or silicone or polyethylene suitable for the fluid and operating temperature of the check valve assembly or filter assembly incorporating same. In the preferred embodiment of the check valve member 250, for example, the member is preferably constructed of a silicone, and preferably a low durometer liquid silicone (e.g. 30 to 50 Shore A), and valve seat section 254 is preferably a surface free of flash, sinks, parting lines, and flow lines. The above noted synthetic resin materials are illustrative and other suitable materials well known in the art can be used.

The retaining members 70, 170, 270, 370, 470, 570 disclosed herein may be constructed of any suitable material, including synthetic resin materials such as nylon, polyester or silicone, or metal, such as stainless steel, brass, or steel, and the preferred embodiment is preferably composed of silicone and monolithic with the bell shaped check valve member. However, the retaining members 70, 170, 270 may be affixed to the base 52, 152, 252, 352 of the bell shaped check valve member by mechanisms readily appreciated by those of skill in the art, such as by glue, hot glue, insert molding, hot melting, heat staking, and the like. Retaining members 470 and 570 may similarly so affixed to their respective bell shaped members. Further, a stem, such as 62, 162, 262, 362 between the retaining member and the bell shaped check valve member base may optionally be similarly affixed between the base and the retaining member, although it is presently preferred to include a stem with the bell shaped check valve member and make it monolithic to the valve member and retaining member and of the same material. The presently preferred embodiment of the bell shaped check valve member 250 is made by injection molding techniques known to those of ordinary skill in the art.

The housing member or body member embodiments 20, 120, 220, 420, 420 as well as their respective cover members, including 90, 190, 290, may be constructed of any suitable material depending upon the application, including synthetic resin, such as nylon, polyester, polyethylene, polypropylene, or metal, such as steel, brass, copper, stainless steel, and the preferred embodiments are preferably of a plastic such as polypropylene. Similarly, the filtration media 80, 180, 280 may be of screen, depth media, membrane woven or non-woven or other construction suitable for the application of filtering air and be composed of cellulose, polypropylene, nylon, or polyester, paper, metal, and/or a combination of the foregoing in serial filtration. Indeed, the filtration media may be of any synthetic resin material suitable for the gas or air and operating temperature of the filter assembly incorporating same. The preferred embodiment of the filtration media 280 is preferably of a felt polypropylene construction, and is sonically welded onto housing member or body member 220 as is evident from weld seam 282 circumscribing chamber 228 and groove 242 (see, e.g., FIG. 22).

As can be readily appreciated, it is believed that the embodiments described herein have the advantageous properties of providing a check valve for a liquid-gas interface, that is normally open to permit gas passage but will close to substantially stop the flow of liquid in one direction and will reliably open to allow gas to flow in the other direction upon experiencing a low vacuum pressure differential across the valve structure, such as from the reservoir of a water cooler, that may be of less than two inches (5.08 cm) of water column. Accordingly, an embodiment of the invention may be utilized to be incorporated into a filter assembly, and preferably an air filter assembly, to protect the filter from excessive water flow therethrough. The resultant check valve assembly and filter assembly has consequent time, cost and other manufacturing efficiencies that heretofore have not been discovered until the invention herein.

A preferred embodiment will hereafter be dimensionally described for purposes of illustration and description only and should not be utilized to limit the scope of the invention herein. For purposes of further description of the preferred embodiment of the check valve assembly (e.g., FIG. 22) includes bell shaped check valve member 250 of a height of about 0.321 inches (0.82 cm) (measuring from the top of retaining member 270 to the bottom of throat entrance 258). The throat entrance or mouth opening 258 is about 0.082 inch (0.21 cm) diameter, and the thickness of the bell shaped member that defines cavity 260 is about 0.020 inch (0.05 cm). Throat section 256 transitions from the throat entrance or mouth opening 258 at about a 25 degree angle from vertical. The wall portion from the base 252 transitioning to about the valve seat section 254 is generally spherical with a diameter of about 0.200 inch (0.05 cm) exterior diameter. Continuous flange 278 has an exterior diameter of about 0.230 inch (0.58 cm), and a vertical height of about 0.025 inch (0.06 cm). Stem 262 is about 0.073 inch (0.19 cm) in height, and about 0.100 inch (0.25 cm) in diameter. Retaining member 270 is about 0.320 inch (0.82 cm) long as it spans across chamber 228, and is about 0.040 inch (0.10 cm) thick, and about 0.080 inch (0.20 cm) wide. Further, inlet 222 has a diameter of about 0.290 inch (0.74 cm) the exterior of inlet wall 226 has a diameter of about 0.370 inch (0.94 cm), and housing 20, 120, 220 has a height of about 0.58 inch (1.47 cm). Outlet wall 34, 134, 234 has a height of about 0.17 inch (0.43 cm) and an exterior of about 0.88 inch (2.24 cm) diameter, and an interior of about 0.74 inch (1.88 cm) diameter, and chamber wall 32, 132, 232 has an interior with a diameter of about 0.35 inch (0.89 cm). Cover member 90, 190, 290 has an exterior with a diameter of about 0.88 inch (2.24 cm), side wall 94, 194, 294 inner diameter of about 0.80 inch (2.03 cm) and height of about 0.21 inch (0.53 cm). Notably, it is believed that the silicone composition and above dimension of the throat entrance or mouth opening 258 in conjunction with the configuration of cavity 260, including its diameter of about 0.160 inch (0.41 cm), enables the preferred embodiment of the check valve member to capture and retain an air bubble when the throat entrance or mouth opening 258 contacts a liquid or water and thereby provides the disclosed check valve assembly and filter assembly incorporating same with a properly functioning check valve for the present application for which the assemblies are intended, including orienting the check valve and filter assembly longitudinal axis from a vertical orientation (e.g. FIG. 2) to a horizontal orientation (about 90 degrees from that of FIG. 2), and therebetween. It will be appreciated that the above dimensions may be altered and modified as a part of a different design and yet not depart from the invention disclosed and claimed herein.

It will be appreciated that alternatives to the preferred embodiments disclosed herein may be appreciated by those of ordinary skill in the art that will fall within the scope of this invention. The disclosed and claimed check valve assemblies and filter assemblies have numerous advantages. The disclosed filter assemblies and check valve assemblies involves relatively simple manufacturing methods and apparatuses, yet provides a satisfactory resulting check valve and filter assembly incorporating same with suitable filtration rating, dirt holding capacity, and check valve closure for the intended application, among others. The disclosed check valve and filter assembly incorporating same is economical and results in an efficiently produced filter assembly and/or check valve suitably configured for its intended application.

While the preferred embodiments of the aspects of the invention have been disclosed, it is to be understood that the invention is not limited to the disclosed examples or their disclosed use. Modifications of design in addition to those discussed can be made without departing from the invention. For example, the housing inlet and outlet, housing chamber, recess, groove, intermediate wall section and transition wall section may have other than circular or cylindrical configurations, such as rectangular or other polygonal prism geometries and yet nevertheless not depart from the invention herein. Further, the outlet channels may be oriented on not only the outlet wall of the housing, but also through the cover in line with the housing outlet channels or displaced thereto, or there may be outlet channels in the cover member and not in the housing. The scope of the invention is accordingly indicated in the appended claims and all changes that come within the meaning and range of equivalency of the claims are therefore intended to be embraced therein. Thus, while the invention has been described with reference to particular embodiments, modification of structure, materials and the like will be apparent to those skilled in the art, yet still fall within the scope of the invention.

What is claimed is:

1. A normally open check valve for passing gas in a first direction, from an upstream side of the valve to a downstream side of the valve, and for passing gas in a reverse direction to the first direction, and for preventing liquid flow in the first direction, comprising:
   a) a body member having a chamber with at least one side wall, an upstream and a downstream opening, the side wall including a tubular side wall portion having a diameter narrowing to at least a contact diameter as the chamber side wall extends upstream;
   b) a bell shaped member with a portion of the member received within the tubular chamber and having a mouth, a closed base, and a flexible wall extending between the mouth and the base that includes an annular portion of diameter greater than the contact diameter of the chamber side wall and greater than the perimeter of the mouth, wherein the specific gravity of the bell shaped member volume as defined by the mouth opening, the base and the wall therebetween is less than one, and the mouth is disposed within the tubular chamber portion facing upstream and the base is generally downstream of the mouth; and
   c) a retaining member affixed to the bell shaped member base, extending generally downstream from the bell shaped member base, and adapted to engage the chamber side wall downstream of the contact diameter; whereby the retaining member arrests movement of the bell shaped member when gas flows past the bell shaped member, and when liquid flows in the first direction past the mouth of the bell shaped member, the bell shaped member wall peripherally contacts the contact diameter of the chamber to thereby stop the flow of liquid past the bell shaped member.

2. The check valve of claim 1 wherein the bell shaped member and the retaining member comprise a silicone material.

3. The check valve of claim 2 wherein the bell shaped member and the retaining member are monolithic.

4. The check valve of claim 1 wherein the retaining member includes a lateral member disposed across the downstream chamber opening.

5. The check valve of claim 1, the bell shaped member further comprising a flange member on the bell shaped member exterior between the mouth and the contact diameter, wherein the flange outboard diameter is greater than the chamber contact diameter.

6. The check valve of claim 5, wherein the flange is discontinuous about the bell shaped member exterior.

7. The check valve of claim 5, wherein the bell shaped member, retaining member, and flange are monolithic and comprise a flexible synthetic resin material.

8. The check valve of claim 5, wherein the flange is continuous about the bell shaped member exterior.

9. The check valve of claim 8, wherein the bell shaped member, retaining member, and flange are monolithic.

10. The check valve of claim 1, wherein the bell shaped member interior comprises gas when the mouth of the bell shaped member contacts liquid.

11. The check valve of claim 1, wherein the bell shaped member mouth is covered by a thin walled member to enclose gas within the bell shaped member.

12. The valve of claim 1, where the bell shaped member interior comprises a foamed synthetic resin material.

13. A normally open check valve for passing gas in a first direction, from an upstream side of the valve to a downstream side of the valve, and for passing gas in a reverse direction to the first direction, and for preventing liquid flow in the first direction, comprising:
   a) a body member having a chamber with at least one side wall that includes a seating surface having a first diameter;
   b) a flexible synthetic resin bell shaped member having a closed end, a wall with a second exterior diameter greater than the seating surface first diameter and a throat with an inner diameter less than the second exterior diameter, wherein the specific gravity of the bell shaped member volume as defined by the throat, the base and the wall is less than one, and the bell shaped member is disposed in the chamber with the throat opening facing upstream and the base generally downstream of the mouth; and
   c) a synthetic resin retaining member affixed to the bell shaped member base, extending generally downstream from the bell shaped member base, with a portion thereof extending laterally to the downstream direction adapted to engage the chamber side wall downstream of the seating surface; whereby the retaining member arrests movement of the bell shaped member when gas flows in the direction reverse of the first direction, and the bell shaped member wall peripherally contacts the seating surface of the chamber at an initial seating wall portion to thereby stop the flow of liquid when liquid flows in the first direction past the seating surface.

14. The check valve of claim 13, the bell shaped member further comprising a flange member on the bell shaped member exterior between the mouth and the initial seating wall portion, wherein the flange outboard diameter is greater than the seating surface first diameter.

15. The check valve of claim 14, wherein the bell shaped member, retaining member, and flange are monolithic and comprise a silicone material.

16. The check valve of claim 14, wherein the flange is discontinuous about the bell shaped member exterior.

17. The check valve of claim 16, wherein the bell shaped member, retaining member, and flange are monolithic and comprise a silicone material.

18. The check valve of claim 14, wherein the flange is continuous about the bell shaped member exterior.

19. The check valve of claim 18, wherein the bell shaped member, retaining member, and flange are monolithic and comprise a silicone material.

20. The check valve of claim 13, wherein the bell shaped member interior comprises gas when the throat of the bell shaped member contacts liquid.

21. The check valve of claim 13, wherein the bell shaped member mouth is covered by a thin walled member to enclose gas within the bell shaped member.

22. The check valve of claim 13, wherein the bell shaped member interior comprises a foamed synthetic resin material.

23. An air filter assembly comprising:
   a) a housing having a chamber with at least one side wall that includes a seating surface having a first diameter, with the chamber having an inlet and an outlet;
   b) a filtration medium affixed over the outlet of the housing chamber; and
   c) a flexible synthetic resin bell shaped member having a closed end, a wall with a second exterior diameter greater than the seating surface first diameter and a throat with an inner diameter less than the bell shaped member second exterior diameter, wherein the specific gravity of the bell shaped member volume as defined by the throat, the base and the wall is less than one, and the bell shaped member is disposed in the chamber with the throat opening toward the chamber inlet and the base facing toward the chamber outlet;
   d) a synthetic resin retaining member monolithic with the bell shaped member base, extending generally toward the chamber outlet and further including a portion extending over the chamber outlet and adapted to engage a portion of the housing; whereby the retaining member arrests movement of the bell shaped member toward the chamber inlet when air flows through the filtration medium toward the chamber inlet, and the bell shaped member wall peripherally contacts the seating surface of the chamber at an initial seating wall portion to thereby stop the flow of liquid when liquid flows from the chamber inlet past the seating surface, to thereby provide a normally open check valve passing gas between the inlet and outlet, and preventing liquid flow through the filtration material.

24. The air filter assembly of claim 23, wherein the bell shaped member interior comprises gas when the throat of the bell shaped member contacts liquid.

25. The air filter assembly of claim 24, the bell shaped member further comprising a flange member on the bell shaped member exterior between the mouth and the initial seating wall portion, wherein the flange outboard diameter is greater than the seating surface first diameter.

26. The air filter assembly of claim 25, wherein the bell shaped member, retaining member, and flange are monolithic.

27. The air filter assembly of claim 26, further comprising a synthetic resin cover member retained upon the housing and extending over the filtration medium.

28. The air filter assembly of claim 27, wherein the flange is continuous about the bell shaped member exterior.

29. The air filter assembly of claim 26, wherein the flange is discontinuous about the bell shaped member exterior.

30. The air filter assembly of claim 24, wherein the bell shaped member and retaining member are monolithic.

31. The air filter assembly of claim 30, further comprising a synthetic resin cover member retained upon the housing and extending over the filtration medium.

32. The air filter assembly of claim 23, wherein the bell shaped member and retaining member are monolithic.

33. The air filter assembly of claim 32, further comprising a synthetic resin cover member retained upon the housing and extending over the filtration medium.

34. The air filter assembly of claim 23, wherein the bell shaped member mouth is covered by a thin walled member to enclose gas within the bell shaped member.

35. The air filter assembly of claim 34, the bell shaped member further comprising a flange member on the bell shaped member exterior between the mouth and the initial seating wall portion, wherein the flange outboard diameter is greater than the seating surface first diameter.

36. The air filter assembly of claim 35, wherein the bell shaped member, retaining member, and flange are monolithic.

37. The air filter assembly of claim 36, further comprising a synthetic resin cover member retained upon the housing and extending over the filtration medium.

38. The air filter assembly of claim 35, wherein the flange is discontinuous about the bell shaped member exterior.

39. The air filter assembly of claim 38, wherein the bell shaped member, retaining member, and flange are monolithic.

40. The air filter assembly of claim 39, further comprising a synthetic resin cover member retained upon the housing and extending over the filtration medium.

41. The air filter assembly of claim 35, wherein the flange is continuous about the bell shaped member exterior.

42. The air filter assembly of claim 41, wherein the bell shaped member, retaining member, and flange are monolithic.

43. The air filter assembly of claim 42, further comprising a synthetic resin cover member retained upon the housing and extending over the filtration medium.

44. The check valve of claim 23, wherein the bell shaped member interior comprises a foamed synthetic resin material.

45. The air filter assembly of claim 44, the bell shaped member further comprising a flange member on the bell shaped member exterior between the mouth and the initial seating wall portion, wherein the flange outboard diameter is greater than the seating surface first diameter.

46. The air filter assembly of claim 45, wherein the bell shaped member, retaining member, and flange are monolithic.

47. The air filter assembly of claim 46, further comprising a synthetic resin cover member retained upon the housing and extending over the filtration medium.

48. The air filter assembly of claim 45, wherein the flange is discontinuous about the bell shaped member exterior.

49. The air filter assembly of claim 48, wherein the bell shaped member, retaining member, and flange are monolithic.

50. The air filter assembly of claim 49, further comprising a synthetic resin cover member retained upon the housing and extending over the filtration medium.

51. The air filter assembly of claim 45, wherein the flange is continuous about the bell shaped member exterior.

52. The air filter assembly of claim 51, wherein the bell shaped member, retaining member, and flange are monolithic.

53. The air filter assembly of claim 52, further comprising a synthetic resin cover member retained upon the housing and extending over the filtration medium.

54. A normally open check valve for passing gas in a first direction, from an upstream side of the valve to a downstream side of the valve, and for passing gas in a reverse direction to the first direction, and for preventing liquid flow in the first direction, comprising:
   a) a body member having a chamber with at least one side wall that includes a seating surface having a first diameter;
   b) a flexible synthetic resin bell shaped member having a closed end, a wall with a second exterior diameter greater than the seating surface first diameter and a throat with an inner diameter less than the second exterior diameter, wherein the specific gravity of the bell shaped member volume as defined by the throat, the base and the wall is less than one, and the bell shaped member is disposed in the chamber with the throat opening facing upstream and the base generally downstream of the mouth; and
   c) a synthetic resin retaining member affixed to the bell shaped member base, with a portion extending to engage a portion of the chamber side wall; whereby the retaining member arrests movement of the bell shaped member when gas flows in the direction reverse of the first direction, and the bell shaped member wall peripherally contacts the seating surface of the chamber at an initial seating wall portion to thereby stop the flow of liquid when liquid flows in the first direction past the seating surface.

55. The check valve of claim 54, the bell shaped member further comprising a flange member on the bell shaped member exterior between the mouth and the initial seating wall portion, wherein the flange outboard diameter is greater than the seating surface first diameter.

56. The check valve of claim 55, wherein the bell shaped member, retaining member, and flange are monolithic and comprise a silicone material.

57. The check valve of claim 55, wherein the flange is discontinuous about the bell shaped member exterior.

58. The check valve of claim 57, wherein the bell shaped member, retaining member, and flange are monolithic and comprise a silicone material.

59. The check valve of claim 55, wherein the flange is continuous about the bell shaped member exterior.

60. The check valve of claim 59, wherein the bell shaped member, retaining member, and flange are monolithic and comprise a silicone material.

61. The check valve of claim 54, wherein the bell shaped member interior comprises gas when the throat of the bell shaped member contacts liquid.

62. The check valve of claim 61, the bell shaped member further comprising a flange member on the bell shaped member exterior between the mouth and the initial seating wall portion, wherein the flange outboard diameter is greater than the seating surface first diameter.

63. The check valve of claim 62, wherein the bell shaped member, retaining member, and flange are monolithic and comprise a silicone material.

64. The check valve of claim 62, wherein the flange is discontinuous about the bell shaped member exterior.

65. The check valve of claim 64, wherein the bell shaped member, retaining member, and flange are monolithic and comprise a silicone material.

66. The check valve of claim 62, wherein the flange is continuous about the bell shaped member exterior.

67. The check valve of claim 66, wherein the bell shaped member, retaining member, and flange are monolithic and comprise a silicone material.

68. The check valve of claim 54, wherein the bell shaped member mouth is covered by a thin walled member to enclose gas within the bell shaped member.

69. The check valve of claim 68, the bell shaped member further comprising a flange member on the bell shaped member exterior between the mouth and the initial seating wall portion, wherein the flange outboard diameter is greater than the seating surface first diameter.

70. The check valve of claim 69, wherein the bell shaped member, retaining member, and flange are monolithic and comprise a silicone material.

71. The check valve of claim 70, wherein the flange is continuous about the bell shaped member exterior.

72. The check valve of claim 71, wherein the bell shaped member, retaining member, and flange are monolithic and comprise a silicone material.

73. The check valve of claim 69, wherein the flange is discontinuous about the bell shaped member exterior.

74. The check valve of claim 73, wherein the bell shaped member, retaining member, and flange are monolithic and comprise a silicone material.

75. The check valve of claim 54, wherein the bell shaped member interior comprises a foamed synthetic resin material.

76. The check valve of claim 75, the bell shaped member further comprising a flange member on the bell shaped member exterior between the mouth and the initial seating wall portion, wherein the flange outboard diameter is greater than the seating surface first diameter.

77. The check valve of claim 76, wherein the bell shaped member, retaining member, and flange are monolithic and comprise a silicone material.

78. The check valve of claim 76, wherein the flange is discontinuous about the bell shaped member exterior.

79. The check valve of claim 78, wherein the bell shaped member, retaining member, and flange are monolithic and comprise a silicone material.

80. The check valve of claim 76, wherein the flange is continuous about the bell shaped member exterior.

81. The check valve of claim 80, wherein the bell shaped member, retaining member, and flange are monolithic and comprise a silicone material.

82. An air filter assembly comprising:
   a) a housing having a chamber with at least one side wall that includes a seating surface having a first diameter, with the chamber having an inlet and an outlet;
   b) a filtration medium affixed over the outlet of the housing chamber; and
   c) a flexible synthetic resin bell shaped member having a closed end, a wall with a second exterior diameter greater than the seating surface first diameter and a throat with an inner diameter less than the bell shaped member second exterior diameter, wherein the specific gravity of the bell shaped member volume as defined by the throat, the base and the wall is less than one, and the bell shaped member is disposed in the chamber with the throat opening toward the chamber inlet and the base facing toward the chamber outlet;
   d) a synthetic resin retaining member monolithic with the bell shaped member base, including a portion adapted to engage a portion of the housing; whereby the retaining member arrests movement of the bell shaped member toward the chamber inlet when air flows through the filtration medium toward the chamber inlet, and the bell shaped member wall peripherally contacts the seating surface of the chamber at an initial seating wall portion to thereby stop the flow of liquid when liquid flows from the chamber inlet past the seating surface, to thereby provide a normally open check valve passing gas between the inlet and outlet, and preventing liquid flow through the filtration material.

83. The air filter assembly of claim 82, wherein the bell shaped member interior comprises gas when the throat of the bell shaped member contacts liquid.

84. The air filter assembly of claim 83, the bell shaped member further comprising a flange member on the bell shaped member exterior between the mouth and the initial seating wall portion, wherein the flange outboard diameter is greater than the seating surface first diameter.

85. The air filter assembly of claim 84, wherein the bell shaped member, retaining member, and flange are monolithic.

86. The air filter assembly of claim 85, further comprising a synthetic resin cover member retained upon the housing and extending over the filtration medium.

87. The air filter assembly of claim 86, wherein the flange is continuous about the bell shaped member exterior.

88. The air filter assembly of claim 85, wherein the flange is discontinuous about the bell shaped member exterior.

89. The air filter assembly of claim 83, wherein the retaining member extends upstream from the bell shaped member wall.

90. The air filter assembly of claim 89, further comprising a synthetic resin cover member retained upon the housing and extending over the filtration medium.

91. The air filter assembly of claim 82, wherein the retaining member extends from the bell shaped member wall.

92. The air filter assembly of claim 91, further comprising a synthetic resin cover member retained upon the housing and extending over the filtration medium.

93. The air filter assembly of claim 82, wherein the bell shaped member mouth is covered by a thin walled member to enclose gas within the bell shaped member.

94. The air filter assembly of claim 93, the bell shaped member further comprising a flange member on the bell shaped member exterior between the mouth and the initial seating wall portion, wherein the flange outboard diameter is greater than the seating surface first diameter.

95. The air filter assembly of claim 94, wherein the bell shaped member, retaining member, and flange are monolithic.

96. The air filter assembly of claim 95, further comprising a synthetic resin cover member retained upon the housing and extending over the filtration medium.

97. The air filter assembly of claim 94, wherein the flange is discontinuous about the bell shaped member exterior.

98. The air filter assembly of claim 97, wherein the bell shaped member, retaining member, and flange are monolithic.

99. The air filter assembly of claim 98, further comprising a synthetic resin cover member retained upon the housing and extending over the filtration medium.

100. The air filter assembly of claim 94, wherein the flange is continuous about the bell shaped member exterior.

101. The air filter assembly of claim 100, wherein the bell shaped member, retaining member, and flange are monolithic.

102. The air filter assembly of claim 101, further comprising a synthetic resin cover member retained upon the housing and extending over the filtration medium.

103. The check valve of claim 82, wherein the bell shaped member interior comprises a foamed synthetic resin material.

104. The air filter assembly of claim 103, the bell shaped member further comprising a flange member on the bell shaped member exterior between the mouth and the initial seating wall portion, wherein the flange outboard diameter is greater than the seating surface first diameter.

105. The air filter assembly of claim 104, wherein the bell shaped member, retaining member, and flange are monolithic.

106. The air filter assembly of claim 105, further comprising a synthetic resin cover member retained upon the housing and extending over the filtration medium.

107. The air filter assembly of claim 104, wherein the flange is discontinuous about the bell shaped member exterior.

108. The air filter assembly of claim 107, wherein the bell shaped member, retaining member, and flange are monolithic.

109. The air filter assembly of claim 108, further comprising a synthetic resin cover member retained upon the housing and extending over the filtration medium.

110. The air filter assembly of claim 104, wherein the flange is continuous about the bell shaped member exterior.

111. The air filter assembly of claim 110, wherein the bell shaped member, retaining member, and flange are monolithic.

112. The air filter assembly of claim 111, further comprising a synthetic resin cover member retained upon the housing and extending over the filtration medium.

* * * * *